United States Patent [19]

Kato et al.

[11] Patent Number: 5,625,613
[45] Date of Patent: Apr. 29, 1997

[54] SUPER-RESOLUTION SCANNING OPTICAL SYSTEM BY INCOHERENTLY SUPERIMPOSING TWO BEAMS

[75] Inventors: Makoto Kato, Hyogo; Kenichi Kasazumi, Osaka, both of Japan

[73] Assignee: Matsushita Electric Industrial Co., Ltd., Osaka, Japan

[21] Appl. No.: 394,273

[22] Filed: Feb. 24, 1995

[30] Foreign Application Priority Data

Feb. 24, 1994 [JP] Japan .................... 6-026586

[51] Int. Cl.$^6$ ........................ G11B 7/00
[52] U.S. Cl. ............ 369/112; 369/44.23; 369/118; 369/116; 369/119
[58] Field of Search ................. 369/110, 112, 369/118, 116, 44.23, 44.37, 119; 359/369, 368, 559

[56] References Cited

U.S. PATENT DOCUMENTS

| | | | |
|---|---|---|---|
| 4,832,446 | 5/1989 | Miyagawa | 359/559 |
| 5,121,378 | 6/1992 | Hirose et al. | 369/118 |
| 5,247,510 | 9/1993 | Lee et al. | 369/118 |
| 5,329,517 | 7/1994 | Yamaguchi et al. | 369/118 |
| 5,355,252 | 10/1994 | Haraguchi | 359/368 |
| 5,450,376 | 9/1995 | Matsumura et al. | 369/110 |

FOREIGN PATENT DOCUMENTS 1-152224  10/1989  Japan .
4-328718  11/1992  Japan .

OTHER PUBLICATIONS

Ando et al., Optical Head with Annular Phase–Shifting Apodizer, Jpn. J. Appl. Phys., vol. 32, pp. 5269–5276, Part 1, No. 11B (1993)–Nov.

Yamanaka et al., High Density Optical Recording by Super-resolution, Jpn. J. Appl. Phys., vol. 28, Supplement 28–3, pp. 197–200 (1989)–Aug.

Suzuki et al., Development of a real-time scanning laser microscope for biological use, Applied Optics, vol. 25, No. 22, pp. 4115–4121 (1986)–Nov.

Ohba et al., Holographic Optical Element with Analyzer Function for Magneto–Optical Disk Head, Jpn. J. Appl. Phys., vol. 28, Supplement 28–3, pp. 359–361 (1989)–Nov.

*Primary Examiner*—Georgia Y. Epps
*Assistant Examiner*—Kim-Kwok Chu
*Attorney, Agent, or Firm*—McDermott, Will & Emery

[57] ABSTRACT

A linearly polarized light beam emitted from a first coherent light source is focused, as a primary beam, onto a preparation via an objective lens. A subsidiary beam emitted from a second coherent light source is a linearly polarized light beam having a plane of polarization perpendicular to that of the primary beam. The subsidiary beam is focused onto the above preparation as a double-humped beam having a center in the same position as that of the primary beam. The principal portion of the subsidiary beam is equal in size to that of the primary beam. The preparation is scanned with the two beams being superimposed on each other. After transmitted by the preparation, the two beams are separated into the primary beam and the subsidiary beam again upon passing through a second polarizing beam splitter so that they are detected individually by first and second optical detectors. Output signals from the first and second optical detectors are calculated by a differential calculator and displayed on a display unit via a second control means.

19 Claims, 12 Drawing Sheets

SUPER-RESOLUTION SCANNING OPTICAL SYSTEM BY INCOHERENTLY SUPERIMPOSING TWO BEAMS

BACKGROUND OF THE INVENTION

The present invention relates to a super-resolution scanning optical apparatus for optically processing information by scanning an object with a focused beam. More particularly, it relates to a super-resolution scanning optical apparatus which is applicable to a laser scanning microscope, a bar-code scanner, an image scanner, a microdensitometer, an optical pickup head apparatus for optical disk, and the like.

The super-resolution scanning optical apparatus mentioned above comprises: a scanning means for scanning a line or plane with a pair of scanning beams obtained by focusing a pair of coherent beams onto the scanned plane; and a photoelectric converting means for detecting the intensity of the respective scanning beams. The above super-resolution scanning optical apparatus is equipped with various arrangements that have been devised to obtain an equivalent fine focal spot equal to or smaller than the diffraction limited.

FIG. 12 is a schematic view showing the structure of a conventional image-forming optical system using an annular diaphragm, which is well-known as a super-resolution optical system, as a double-diffraction optical system. Such a super-resolution optical system using the annular diaphragm has found application in optical pickup head apparatus, which are reported in the following documents.

(1) "High Density Optical Recording by Super-Resolution," Y. Yamanaka, Y. Hirose and K. Kubota, Proc. Int. Symp. on Optical Memory, 1989, Jap. J. of Appl. Phys., Vol. 28 (1989) supplement 28-3, pp.197–200.

(2) "Optical Head with Annular Phase-Shifting Apodizer," Hideo Ando, Tsuneshi Yokota and Koki Tanoue, Jap. J. Appl. Phys., Vol. 32 (1993) pp.5269–5276, pt. 1, NO.11B.

As shown in FIG. 12, a coherent beam emitted from a coherent light source 50 is turned into parallel beams upon passing through a collimator lens (a first Fourier transform lens) 51. The resulting parallel beams are then allowed to pass through apertures 52a and 52b (slits in one dimension) of an annular diaphragm 52 and converged by an objective lens (a second Fourier transform lens) 53 so as to form an image, thereby providing a super-resolution spot as the I(X) which is shown as the power spectrum (transmittance) of the foregoing annular diaphragm 52. The above document (1) discloses an optical head which forms such a super-resolution spot in one dimension and uses only the main lobe thereof obtained by means of knife-edges constituting a slit. The above document (2) discloses a system which uses a plurality of phase distributions and a specified amplitude distribution as the annular diaphragm in order to form a super-resolution in two dimensions, thereby suppressing the side lobes on both sides of the main lobe shown in FIG. 12. In the system, the conditions for designing the annular diaphragm are optimized to suppress the side lobes.

However, the system for suppressing the side lobes by means of the annular diaphragm is not free from a reduction in intensity of the focused beam. In the case where the peak intensity of the focused beam is reduced to about 50% to 15%, e.g., if the full width half maxim (FWHM) of the main lobe is reduced to 85% of the diffraction limited, the intensity of the side lobe becomes about 74% of the peak intensity of the main lobe.

As described above, if the image of the aperture through which light is incident upon the objective lens is formed into a slit or an annularity, there can be achieved super-resolution smaller than the diffraction limited with the side lobes suppressed to a certain extent. However, since the mount of light reaching an image forming plane is reduced significantly, the quantity of light in the main lobe is also reduced disadvantageously. Moreover, since the aperture for shielding the side lobes is provided, a higher accuracy is required in adjusting the optical path, while the reliability of the apparatus is lowered because the alignment of the scanning optical system is deteriorated with the passage of time or for other reasons. Furthermore, the FWHM of the beam is reduced to about 10% to 20% at most.

SUMMARY OF THE INVENTION

In view of the foregoing, an object of the present invention is to provide a super-resolution scanning optical apparatus with extremely high performance wherein a simple optical system preferably prevents a significant reduction in the quantity of light, and the equivalent beam width can be reduced to about 50% of that of the diffraction limited.

A first super-resolution scanning optical system is composed of a super-resolution scanning optical system, wherein a primary beam having a peak intensity in the center thereof and a subsidiary beam having peak intensities at least on both sides of the center thereof, both having equal-sized principal portions, are incoherently superimposed upon each other for use in scanning a plane to be scanned and the light beam transmitted or reflected by the plane to be scanned is separated into the primary beam and subsidiary beam so that the light intensities thereof are differentially detected.

Specifically, the first super-resolution scanning optical apparatus comprises: a first coherent light source for emitting a first coherent beam serving as a primary beam; a second coherent light source for emitting a second coherent beam which has either a plane of polarization perpendicular to the plane of polarization of the above first coherent beam or a wavelength different from the wavelength of the above first coherent beam; a phase plate for receiving the above second coherent beam and emitting a subsidiary beam which has an intensity distribution in which peak values are placed at least on both sides of the center thereof on a plane perpendicular to an optical axis and the principal portion thereof is equal in size to the principal portion of the above primary beam; a focusing means for superimposing the primary beam emitted from the above first coherent light source and the subsidiary beam emitted from the above phase plate upon each other and focusing them onto a plane to be scanned; a scanning means for scanning the above plane to be scanned with a light beam composed of the above primary beam and the subsidiary beam being superimposed upon each other; a light separating means for receiving the light beam transmitted or reflected by the above plane to be scanned, separating the light beam into the primary beam and the subsidiary beam through polarization separation or wavelength separation, and transmitting them; an optical detecting means for individually detecting the intensity of the primary beam and the intensity of the subsidiary beam and outputting a light intensity signal; and a calculating means for calculating, based on the light intensity signal outputted from the optical detecting means, a super-resolution scanned signal and outputting it.

According to the first super-resolution scanning optical apparats, the primary beam has the normal Airy-disc pattern or has a peak intensity on the optical axis. On the focal plane, the principal portion of the subsidiary beam has a beam size equal to the FWHM of the primary beam. Peaks are formed at least on both sides of the center of the subsidiary beam. On the plane to be scanned, the primary beam and the subsidiary beam are incoherently superimposed upon each other for scanning, so that the primary beam forms a beam profile having the Airy-disc pattern or having a peak intensity in the center thereof, while the subsidiary beam forms a beam profile having a principal portion equal in size to that of the primary beam and having a double-humped intensity distribution with peak values placed at least on both sides of the center thereof. The light beam obtained by superimposing the primary beam and the subsidiary beam upon each other on the plane to be scanned is transmitted or reflected by the plane to be scanned and then separated into the primary and the subsidiary beams again through polarization or wavelength separation, so that the intensities thereof are detected individually. The detected light intensities are differentially calculated so that the output signal is obtained as a difference in intensity distribution between the primary beam and the subsidiary beam. Therefore, a super-resolution scanned signal can surely be obtained with ease. Consequently, the resolving power of the scanning optical system surpasses that of the diffraction limited of the objective lens in use, thereby equivalently implementing half the beam width of the diffraction limited. The subsidiary beam having a double-humped intensity distribution can easily be generated by means of a stepped phase plate which provides a relative phase difference varying from 0 to $\pi$ to the wavelength of the light transmitted thereby. By irradiating the phase plate with a coherent beam having substantially the same intensity distribution as the primary beam, substantially the same intensity distribution as provided in the peripheral portion of the primary beam can be provided in the peripheral portion of the double-humped beam. Such waveform shaping for a beam can be performed by optimizing the diameter of an aperture through which the primary and subsidiary beams pass.

A second super-resolution scanning optical apparatus is composed of a super-resolution scanning optical system, wherein the coherent beam emitted from a single coherent light source is separated by a polarizing phase plate into a primary beam having a peak intensity in the center thereof and a subsidiary beam having peak intensities at least on both sides of the center of the primary beam, both having planes of polarization perpendicular to each other, so that they are superimposed upon each other for use in scanning a plane to be scanned and the light beam transmitted or reflected by the plane to be scanned is separated through polarization separation so as to differentially detect the respective light intensities. Specifically, the second super-resolution scanning optical apparatus comprises: a coherent light source for emitting a coherent beam; a polarizing phase plate for receiving the coherent beam emitted from the coherent light source, separating the coherent beam into a primary beam and a subsidiary beam which has a plane of polarization perpendicular to the plane of polarization of the primary beam and an intensity distribution in which peak values are placed at least on both sides of the center of the above primary beam and the principal portion thereof is equal in size to the principal portion of the above primary beam, and emitting the primary beam and the subsidiary beam; a focusing means for superimposing the primary beam and subsidiary beam emitted from the polarizing phase plate upon each other and focusing them onto a plane to be scanned; a scanning means for scanning the above plane to be scanned with a light beam composed of the above primary beam and subsidiary beam being superimposed upon each other; a light separating means for receiving the light beam transmitted or reflected by the above plane to be scanned, separating the beam into the primary beam and the subsidiary beam through polarization separation, and transmitting them; an optical detecting means for individually detecting the intensity of the primary beam and the intensity of the subsidiary beam and outputting a light intensity signal; and a calculating means for calculating, based on the light intensity signal outputted from the photo-detecting means, a super-resolution scanning signal and outputting it.

According to the second super-resolution scanning optical apparatus, the primary beam and subsidiary beam having planes of polarization perpendicular to each other can be obtained from the coherent beam emitted from the single coherent light source. Moreover, the principal portion of the primary beam is equal in size to that of the subsidiary beam. The primary beam has a peak intensity on the optical axis, while the subsidiary beam has peak intensities at least on both sides of the center of the primary beam. On the plane to be scanned, the primary beam and subsidiary beam are incoherently superimposed upon each other for scanning. After the light beam obtained by superimposing the primary beam and subsidiary beam upon each other was transmitted or reflected by the plane to be scanned, it is separated into the primary beam and subsidiary beam again through polarization separation so that the intensities thereof are detected individually. The detected light intensities are differentially calculated so that an output signal is obtained as a difference in intensity distribution between the primary beam and the subsidiary beam. Consequently, a super-resolution scanned signal can surely be obtained with ease.

Since the primary and subsidiary beams emitted from the single coherent light source are led to the polarizing phase plate and the plane to be scanned is provided on their conjugate plane, they are used for scanning with their optical axes completely coincident with each other, so that an extremely stable and excellent super-resolution scanning optical system can be implemented by an extremely simple structure.

A third super-resolution scanning optical apparatus is composed of a super-resolution scanning optical system using a holographic device in place of the phase plate of the first super-resolution scanning optical apparatus.

Specifically, the third super-resolution scanning optical apparatus comprises: a first coherent light source for emitting a first coherent beam serving as a primary beam; a second coherent light source for emitting a second coherent beam which has either a plane of polarization perpendicular to the plane of polarization of the above first coherent beam or a wavelength different from the wavelength of the above first coherent beam; a holographic device for receiving the above second coherent beam and emitting a subsidiary beam which has an intensity distribution in which peak values are placed at least on both sides thereof on a plane perpendicular to an optical axis and the principal portion thereof is equal in size to the principal portion of the above primary beam; a focusing means for superimposing the primary beam emitted from the above first coherent light source and the subsidiary beam emitted from the above holographic device upon each other and focusing them onto a plane to be scanned; a scanning means for scanning the above plane to be scanned with a light beam composed of the above primary beam and said subsidiary beam being superimposed upon each other; a light separating means for receiving the light beam transmitted or reflected by the above plane to be scanned, separating the light beam into the primary beam and the subsidiary beam through polarization separation or wavelength separation, and transmitting them; an optical detecting means for individually detecting the intensity of the primary beam and the intensity of the subsidiary beam and outputting the respective light-intensity signals; and a calculating means for calculating, based on the light intensity signals outputted from the optical detecting means, a super-resolution scanned signal and outputting it.

According to the third super-resolution scanning optical apparatus, the primary beam has the normal Airy-disc pattern or has a peak intensity on the optical axis. On the focal plane, the principal portion of the subsidiary beam reproduced from the holographic device has a beam size equal to the FWHM of the primary beam. Peak intensities are formed at least on both sides of the center of the subsidiary beam. On the plane to be scanned, the primary beam and subsidiary beam are incoherently superimposed upon each other for scanning. The light beam obtained by superimposing the primary beam and subsidiary beam upon each other on the plane to be scanned is transmitted or reflected by the plane to be scanned and separated into the primary beam and subsidiary beam through polarization separation so that the intensities thereof are detected individually. The detected light intensities are differentially calculated so that an output signal is obtained as a difference in intensity distribution between the primary beam and the subsidiary beam. Consequently, a super-resolution scanned signal can surely be obtained with ease.

Thus, according to the third super-resolution scanning optical apparatus, the subsidiary beam can be generated by the holographic device functioning as a phase plate. Even though complicated procedures are required in the process of fabricating a phase plate, the apparatus needs the provision of only one phase plate, so that the holographic devices can be manufactured on an industrial scale. Alternatively, it is also possible to use a technique of computer-generated holography whereby a phase plate is designed on a computer without actual need of fabrication, so that flexibility in designing and fabrication is enhanced.

Preferably, each of the first to third super-resolution scanning optical apparatus further comprises: an output means for displaying, printing, or storing information on an image on the plane to be scanned; and a control means for receiving the super-resolution scanning signal outputted from the calculating means and controlling the output means so that it displays, prints, or stores the information on the image on the plane to be scanned.

Thus, the super-resolution scanned signal outputted from the super-resolution scanning optical system can be displayed, printed, or stored so that information on the scanned image can be outputted to a standard (conventional) CRT display unit, printing unit, or storing unit (image memory). Consequently, the super-resolution scanning optical system can be used as a super-resolution laser scanning microscope, so that the micro-structure of an object transmitting or reflecting light, such as an organic sample, can be observed, printed, or filed with an improved resolution of approximately twice of that of the conventional diffraction limited.

Preferably, in the first or third super-resolution scanning optical apparatus, the first and second coherent light sources are a pair of linearly polarized lasers which are arranged so that their planes of polarization are perpendicular to each other.

Since a pair of linearly polarized laser beams are incoherent to each other, they can easily be separated from each other through polarization separation, so that the primary beam and subsidiary beam having planes of polarization perpendicular to each other can be obtained by a simple structure. In this case, since the primary beam and subsidiary beam can be obtained by simply setting the light-emitting faces of the pair of linearly polarized laser beams in specified alignment, the optical system in use has a simpler structure.

Preferably, in each of the first to third super-resolution scanning optical apparatus, the light separating means consists of a substrate the refractive index of which is uniaxially anisotropic and a polarizing holographic device or a polarizing diffraction grating so as to serve as a polarization separating means for separating the light beam into the primary beam and the subsidiary beam through polarization separation.

Since the polarizing holographic device or the polarizing diffracting device transmits the major portion of the polarized beam of either one of the primary and subsidiary beams as ± first-order diffracted beams, while transmitting the polarized beam of the other of the primary and subsidiary beams as a zero-order diffracted beam, the primary beam and subsidiary beam can surely be separated in space so that the intensities thereof can be detected individually. Thus, since polarization separation can be implemented by means of a flat polarizing holographic device or a flat diffraction grating, a more compact super-resolution scanning optical system can be implemented at lower cost than in the case of using a polarizing beam splitter.

Preferably, in the first or third super-resolution scanning optical apparatus, the light separating means is composed of a multi-layer dielectric filter so as to serve as a wavelength separating means for separating the light beam into the primary beam and the subsidiary beam through wavelength separation.

Since the multi-layer dielectric filter functions as a narrow-band pass filter, the primary beam and subsidiary beam having wavelengths slightly different from each other can be separated from each other efficiently due to the transmittance characteristics of the narrow band pass filter, and also by the reflectance of the inverse characteristics. In this case, since the polarization characteristic can be determined selectively, the optimum polarization characteristic required by the acoust-optical deflector can easily be satisfied, so that a super-resolution scanning microscope which enables real-time display can easily be implemented.

Preferably, in the second super-resolution scanning optical apparatus, the polarizing phase plate separates the coherent beam emitted from the coherent light source into an optical component having a plane of polarization in one direction and an optical component having a plane of polarization in another direction, the above planes of polarization being perpendicular to each other, emits, as the primary beam, the optical component having the plane of polarization in one direction, has a first region which does not provide any relative phase difference to the optical component having the plane of polarization in another direction and a second region which provides a relative phase difference of $\pi$ to the optical component having the plane of polarization in another direction, and emits, as the subsidiary beam, the optical component passing through the first and second regions.

The polarizing phase plate emits the primary beam having a plane of polarization in one direction as it is, while providing a beam having a plane of polarization in another direction with a relative phase difference varying from 0 to π so that it is emitted as the subsidiary beam having peak intensities at least on both sides of the center thereof and a principal portion equal in size to that of the primary beam. Consequently, it becomes easy to scan the plane to be scanned with the primary beam and subsidiary beam being superimposed upon each other, to separate the light beam reflected from the plane to be scanned into the primary and subsidiary beams again through polarization separation, and to detect the intensities thereof individually. In this case, since the primary beam and subsidiary beam are produced through polarization separation, the intensity distributions in the peripheral portions of the primary and subsidiary beams are the same in configuration, so that their optical axes are not displaced from each other even when beam scanning is performed. The output signal indicating the intensities of the primary and subsidiary beams is differentially calculated, so that a scanning signal which achieves super-resolution at least in one dimension can be obtained extremely stably.

Preferably, the first and second regions are formed around the center of the polarizing phase plate in four regions so that the two first regions alternate the two second regions. Thus, it is possible to scan the plane to be scanned with the light beam obtained by superimposing the primary beam and the subsidiary beam having peak intensities in four directions around the center thereof upon each other. After scanning, the light beam is separated into the primary beam and subsidiary beam again through polarization separation, so that the intensities thereof are detected individually. Consequently, super-resolution scanning equivalent to the scanning using an angular beam thinner than the diffraction limited can be performed stably.

Preferably, in the first super-resolution scanning optical apparatus, the phase plate is divided into N (N is an integer equal to or more than 2) regions around the center thereof, the N regions providing a relative phase difference advancing stepwise in the sequence of 0, $2\pi/N$, $(2\pi/N)\times 2$, $(2\pi/N)\times 3$, ..., and $(2\pi/N).(N-1)$ to the second coherent beam emitted from the second coherent light source and emits the second coherent beam passing through the N regions as the subsidiary beam.

Preferably, in the second super-resolution scanning optical apparatus, the polarizing phase plate separates the coherent beam emitted from the coherent light source into an optical component having a plane of polarization in one direction and an optical component having a plane of polarization in another direction, the above planes of polarization being perpendicular to each other, emits the optical component having the plane of polarization in one direction without providing any relative phase difference thereto, has N (N is an integer equal to or more than 2) regions around the center thereof which provides a relative phase difference advancing stepwise in the sequence of 0, $2\pi/N$, $(2\pi/N)\times 2$, $(2\pi/N)\times 3$, ..., and $(2\pi/N).(N-1)$ to the optical component having the plane of polarization in another direction, and emits, as the subsidiary beam, the optical component passing through said N regions.

In this manner, the plane to be scanned can be scanned with the light beam obtained by superimposing the primary beam and the subsidiary beam, which has peek intensities around the center of the beam and which is coaxial with the primary beam, upon each other. After scanning, the light beam is subjected to polarization separation into the primary beam and subsidiary beam so that the intensities thereof are detected individually. Consequently, super-resolution scanning equivalent to the scanning using a circular beam thinner than the diffraction limited can be performed stably. Thus, by using the polarizing phase plate symmetrical with respect to the axis, the first and second super-resolution scanning optical apparatus, which are equivalent in performance to the super-resolution beam scanning optical system symmetrical with respect to the axis, can be implemented easily and stably with much advantage.

Preferably, in each of the first to third super-resolution scanning optical apparatus, the scanning means has a pair of acoust optical deflectors for deflecting the primary beam and the subsidiary beam in two directions perpendicular to each other on the plane to be scanned. Thus, the scanning means performs high-speed scanning in two directions perpendicular to each other, so that a two-dimensional image can be obtained in real time.

DETAILED DESCRIPTION OF THE PREFERRED EMBODIMENTS

Below, the embodiments of the present invention will be described with reference to the drawings.

Figure 1:
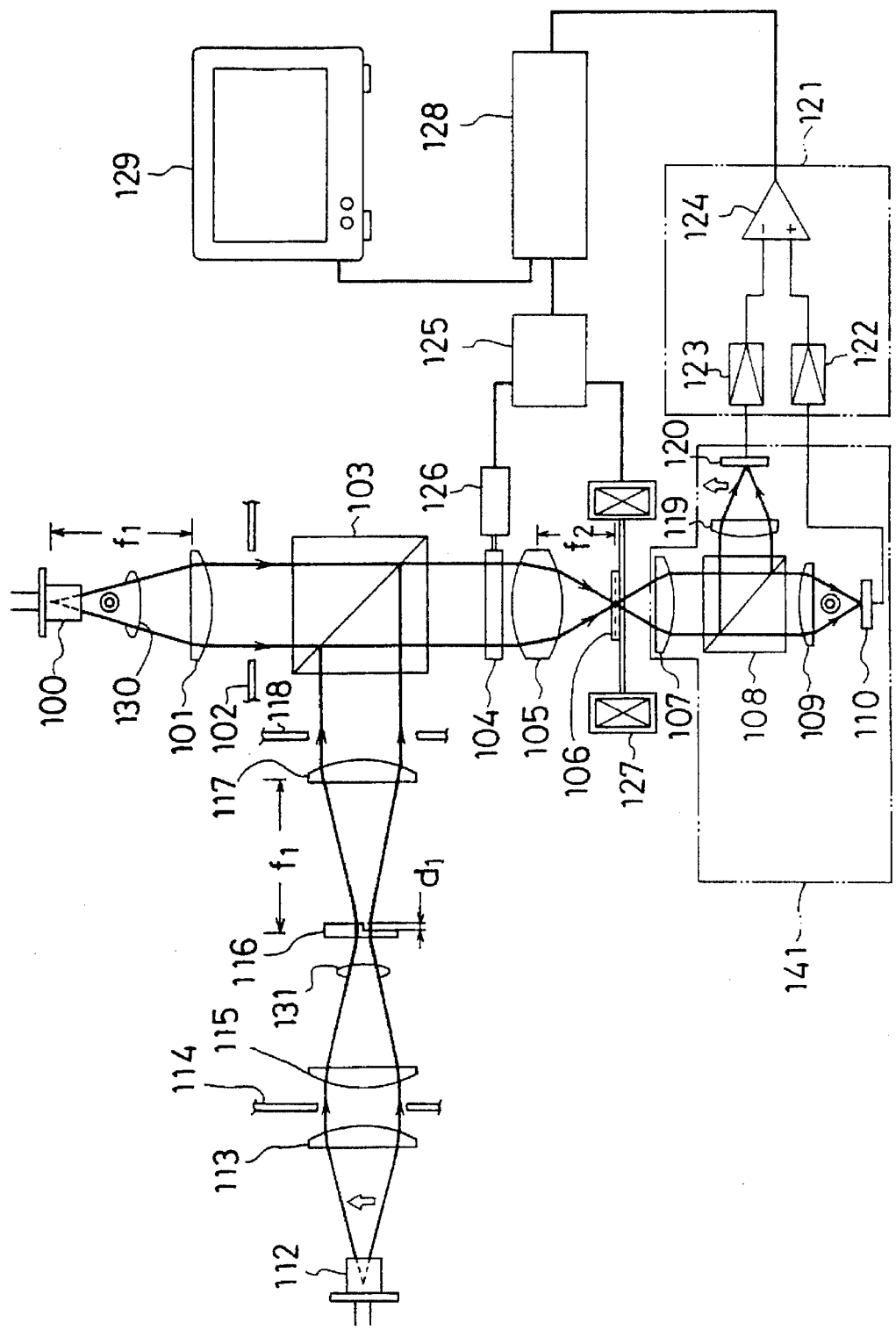
FIG. 1 is a schematic view showing the structure of a super-resolution scanning optical apparatus according to a first embodiment of the present invention.

FIG. 1 schematically shows the structure of a super-resolution scanning optical apparatus according to a first embodiment of the present invention.

As shown in FIG. 1, a primary beam, which is a first linearly polarized coherent beam, is emitted from a first coherent light source composed of a semiconductor laser. After sequentially passing through a first collimator lens 101, a First aperture 102, and a first polarizing beam splitter 103, the primary beam is reflected by a galvanometer mirror 104 and then focused by an objective lens 105 for focusing so as to form an image on a preparation 106 serving as a plane to be scanned. The primary beam transmitted by the preparation 106 passes through a condenser lens 107 and a second polarizing beam splitter 108, is focused by the a first focusing lens 109, and then reaches a first optical detector 110.

On the other hand, a subsidiary beam, which is a second linearly polarized coherent beam, is emitted from a second coherent light source composed of a semiconductor laser. After sequentially passing through the second collimator lens 113 and a second aperture 114, the subsidiary beam is focused upon passing through a second focusing lens 115 so as to irradiate a polarizing phase plate 116 having two phase regions (0, π), which will be described later in detail. Since the first embodiment uses the separate first and second coherent light sources 100 and 112, as shown in FIG. 1, the polarizing phase plate 116 may be composed of a conventional (non-polarized) phase plate. After passing through the polarizing phase plate 116, the subsidiary beam further passes through a third collimator lens 117, a third aperture 118, and a first polarizing beam splitter 103, is reflected by the galvanometer mirror 104, and focused by the objective lens 105, while overlapping the primary beam, so as to form an image on the preparation 106. In this case, the optical axis of the primary beam coincides with the optical axis of the subsidiary beam on the optical axis of the objective lens 105.

After transmitted by the preparation 106, the subsidiary beam passes through the condenser lens 107 and the second polarizing beam splitter 108, is focused by the third focusing lens 119, and reaches a photo-detector 120.

The planes of polarization of the primary and subsidiary beams are perpendicular to each other. The first polarizing beam splitter 103 transmits the primary beam, while reflecting the subsidiary beam, so that the primary beam and the subsidiary beam are superimposed upon each other on the preparation 106 and are focused with no loss in the quantity of light. After transmitted by the preparation 106, the primary and subsidiary beams have their planes of polarization separated from each other by the second polarizing beam splitter 108 and are subjected to photo-electric conversion by the first and second photo-detectors 110 and 120, respectively. An electrical signal outputted from the first optical detector 110 is amplified by a first amplifier 122 of a signal calculation processing unit 121, while an electrical signal outputted from a second optical detector 120 is amplified by a second amplifier 123 of the signal calculation processing unit 121, so that they are calculated by a differential calculator 124.

A first control means 125 controls a driving unit 126 of the galvanometer mirror 126 so that it generates a driving voltage of a saw-tooth wave at, e.g., 1.575 KHz, thereby scanning the plane to be scanned with a light beam in the X-direction, while it supplies a saw-tooth wave at, e.g., 6 Hz to an electromagnetic diving means (voice coil) 127 adjacent to a preparation holder, thereby perpendicularly scanning the plane to be scanned with a light beam in the Y-direction.

The first control means 125 is connected to a second control means 128 having the functions of: performing image processing, such as amplification or contrast enhancement, with respect to an output signal from the signal calculation processing unit 121; and serving as an interface for an image-information storing/displaying unit 129. To perform the above-mentioned functions, the second control means 128 has such means as a CPU (central processing unit), a memory, and a keyboard (the drawings thereof are omitted here).

Figure 2:
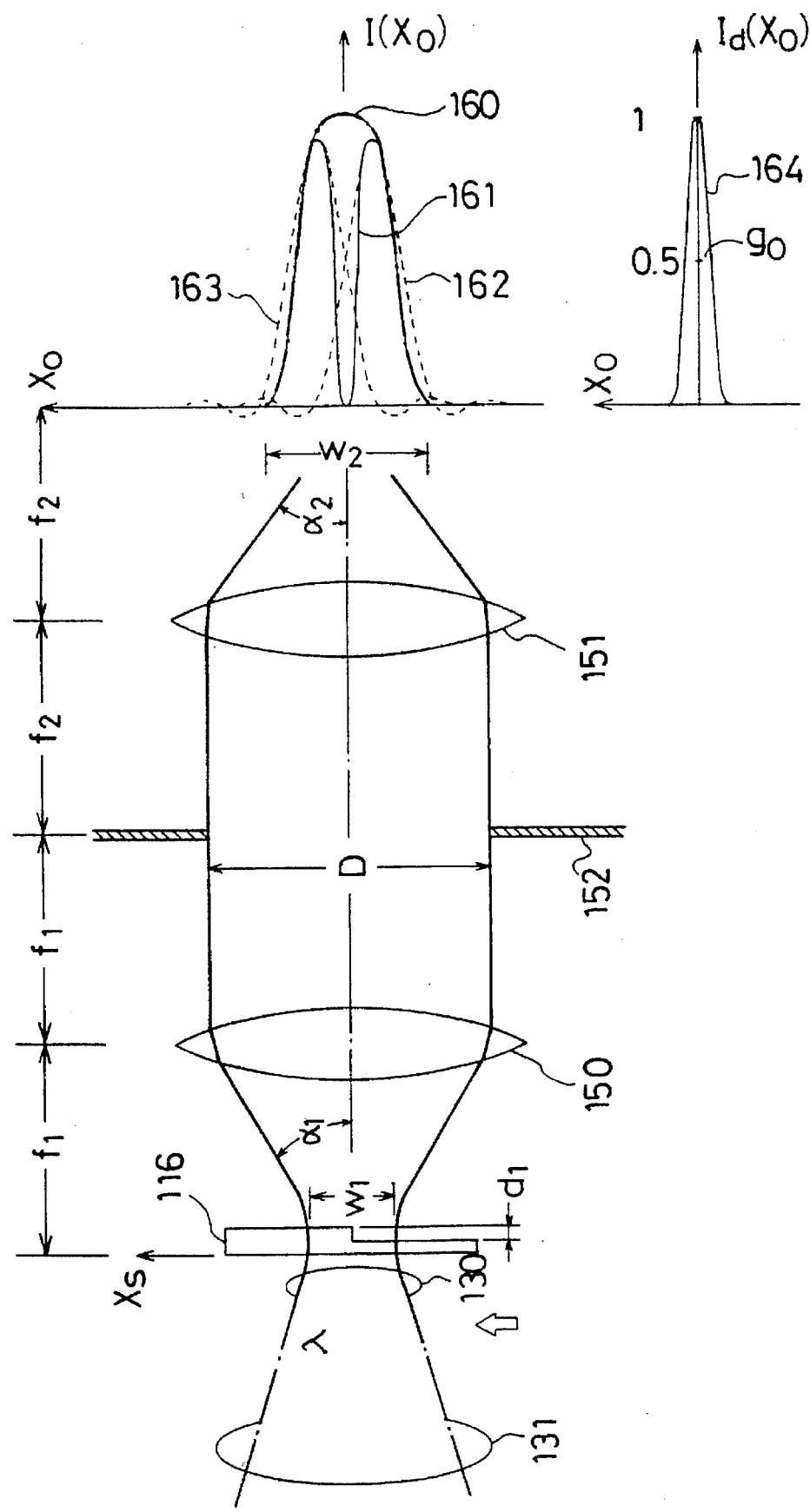
FIG. 2 is a schematic view illustrating, using a one-dimensional model, the production of a subsidiary beam and the structural principle of the super-resolution scanning optical system, which are common to all the embodiments of the present invention.

FIG. 2 is for diagrammatically illustrating the intensity distributions of the primary and subsidiary beams on the plane to be scanned in the first embodiment. Although it has already been illustrated in FIG. 1 that the primary beam and subsidiary beams are propagated in different spaces and then combined with each other on the same axis by the first polarizing beam splitter 103 to be superimposed upon each other on the preparation 106, an $X_S$-axis is provided across the polarizing phase plate 116 in FIG. 2(a) for the purpose of illustrating the principle of super-resolution of the present invention by using a simple one-dimensional model. Here, it is assumed that the primary beam 130 is also incident upon the $X_S$-axis and has the same beam waist diameter $W_1$ as the subsidiary beam 131. The first and third collimator lenses 101 and 117 in FIG. 1 correspond to a first convex lens 150 in FIG. 2(a). The objective lens 105 in FIG. 1 corresponds to a second convex lens 151 in FIG. 2(a). The first and third apertures 102 and 118 in FIG. 1 correspond to an aperture 152 in FIG. 2(a). However, the diameter $W_1$ of a light beam at a wavelength λ is set approximately 1.5 times as large as the beam diameter $W_R$ ($W_R$ is substantially equal to λ/(N.A) =λ/sinα$_1$) of the diffraction limited for the diameter D of the aperture 152. The first and second convex lenses 150 and 151 are Fourier transform lenses, which satisfy the following simultaneous equations of $$f_1 \cdot \sin \alpha_1 = f_2 \cdot \sin \alpha_2 = D/2. \qquad (1)$$

in this case, the principal portion of the intensity distribution 160 of the primary beam 130 is equal in size to that of the intensity distribution 161 of the subsidiary beam 131 on the $X_0$-axis in an image forming plane, which becomes $W_2$ ($W_2$ is substantially equal to $(f_2/f_1).W_1$). Here, the polarizing phase plate 116 is a substrate having the phase boundary with a difference in level $d_1$, which causes a phase difference π, on the optical axis and having a refractive index n with respect to the wavelength λ, which satisfies the equation of (n−1)d=λ/2. Accordingly, the intensity distribution 161 of the subsidiary beam 131 mentioned above can be obtained as a result of the overlapping of two wavefronts 162 and 163 having amplitude distributions in opposite phases on the $X_0$-axis. As shown in FIG. 2(b), only that portion of the subsidiary beam 131 which is depressed in the vicinity of the optical axis remains as a difference $I_d$ ($x_0$) between the intensity distribution 161 and the intensity distribution 160 of the primary beam 130 and the full width half maximum $g_0$ becomes about half the full width maximum $g_R$ of the diffraction limited in size.

As described earlier, the above principle of super-resolution is implemented by a unit 141 for detecting the separation between the primary and subsidiary beams 130 and 131 and by the signal calculation processing unit 121.

Figure 3:
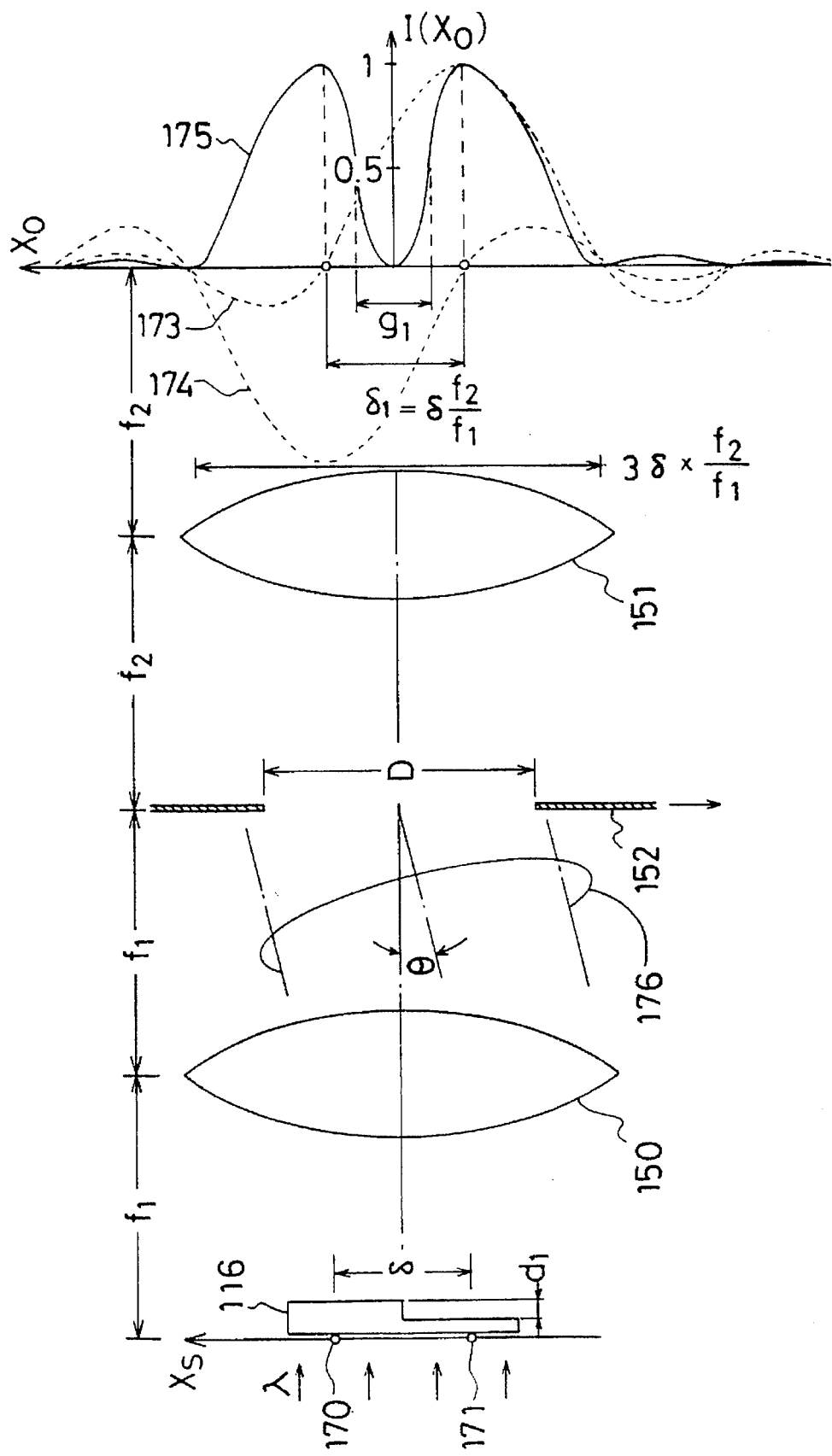
FIG. 3 is a schematic view illustrating, using a simple one-dimensional model, the principle of the super-resolution scanning optical system which is common to all the embodiments of the present invention.

FIG. 3 diagrammatically shows a variation which is an optical system similar to that of FIG. 2 but which can be analytically handled for easy understanding. The optical system of FIG. 3 is different from that of FIG. 2 in that the subsidiary beam 131 is given by two points 170 and 171 which are apart from each other by a δ=(λ.f$_1$)/D The two points 170 and 171 on the $X_0$-axis constitute the amplitude distributions 173 and 174 of the diffraction limited via the rectangular aperture 152, which are different in phase by π.

The centers of the amplitude distributions 173 and 174 are apart from each other by $\delta_1 = \delta \times (f_2/f_1)$ Since the distances $\delta$ and $\delta_1$ are set so that one amplitude becomes 0 in the peak position of the other, the intensity distribution 175 as shown FIG. 3 can be obtained. If analytically shown, the complex amplitude $u_1(X_0)$ of a double-humped beam obtained as the subsidiary beam 131 on the $X_0$-axis becomes $$u_1(X_0) = C_1 \times \text{sinc}[\{2\pi/(\lambda \cdot f_2)\} \times (D/2) \times \{X_0 + (\delta_1/2)\}] - C_1 \times \text{sinc}[\{2\pi/(\lambda \cdot f_2)\} \times (D/2) \times \{X_0 - (\delta_1/2)\}] \quad (2)$$

and the intensity distribution $I(X_0)$ becomes $$I(X_0) = |u_1(X_0)|^2. \quad (3)$$

In the foregoing equation (2), $$\text{sinc} X = (\sin X)/X \quad (4)$$

is satisfied.

$$\delta_1 = \delta \times (f_2/f_1) = (f_2 \cdot \lambda)/D = (1/2) \cdot (\delta/\sin \delta_2) \quad (5)$$

concerns the resolving power of a microscope having a numerical aperture of $\sin \alpha_2$, which corresponds to the criterion of Rayleigh (in general, the minimum separation of adjacent two points that can be resolved). A description will be given later to an expansion into two dimensions. In that case, the Bessel function of the first kind $J_1(r)$ is used instead of the sinc function to represent the amplitude and intensity distributions of the Airy pattern. The amplitude distribution of the Airy pattern which is formed on an optical axis through a circular aperture is given by $$u(r) = (2\pi(D/2)^2 J_1(R))/R \quad (6)$$

where r is a distance from the center of the optical axis and R is given by $R = (\pi \cdot D \cdot r)/(\lambda \cdot f_2)$.

The size of a main lobe termed the Airy disk is given by $$A = 2 \times 1.22 \times (\lambda \cdot f_2)/D, \quad (7)$$

which is only 1.22 times as large as the size B of the main lobe obtained through a rectangular aperture, which is given by $$B = 2 \times (\lambda \cdot f_2)/D \quad (8)$$

Thus, the diameter of the trough in the center of the double-humped beam formed by the subsidiary beam 131 focused on the plane to be scanned is about half the beam diameter of the diffraction limited of the second concave lens 151 (objective lens 105 in FIG. 1). The dimensions of the principal portion of the primary beam 130 are equated with those of the principal portion of the subsidiary beam 131 and the primary beam 130 and subsidiary beam 131 are detected individually, followed by calculations by the differential amplifier 124. In this manner, the output signal from the differential calculator 124 equivalently corresponds to a signal obtained by scanning with about half the beam size of the diffraction limited. The size of the primary beam 130 can be adjusted by means of the first aperture 102 in FIG. 1, while the size of the subsidiary beam 131 can be adjusted by means of the second and third apertures 114 and 118 in FIG. 1.

Figure 8A:
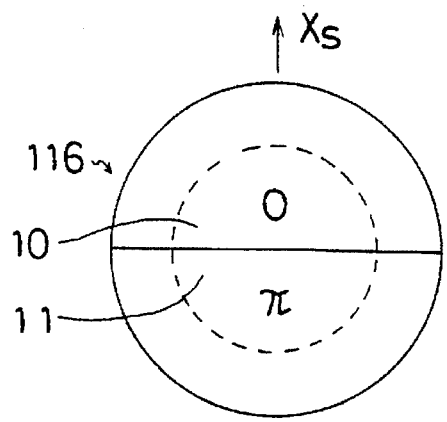
FIG. 8(a) through (c) are a view illustrating an example of the structure of a phase plate for producing the subsidiary beam, which is used in common in all the embodiments of the present invention.

As shown in FIG. 8(a), the polarizing phase plate 116 (or a normal phase plate) consists of a first region 10 having a certain thickness and a second region 11 which is different in thickness from the first region 10 by $d_1$. It has already been described that the double-humped distribution of light intensity can be obtained in the $X_S$-direction of FIG. 8(a) with the arrangement. Hence, the one-dimensional effect of super-resolution is achieved in the $X_S$-direction. In the case of forming the primary beam 130 and subsidiary beam 131 with the separate optical systems as shown in FIG. 1, the same effect can be obtained using a non-polarizing phase plate instead, as described above.

Figure 8B:
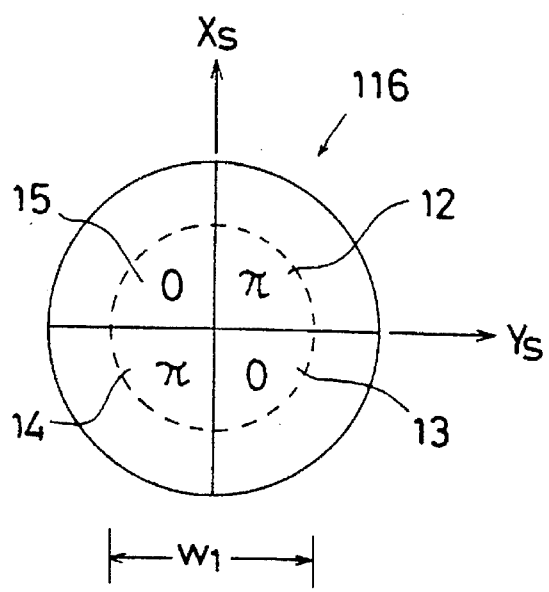
Figure 8C:
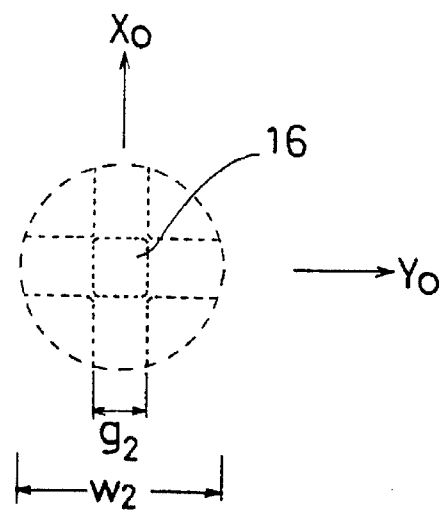

FIG. 8(b) shows another example of the structure of the polarizing phase plate 116 (or a non-polarized phase plate), in which the polarizing phase plate 116 consists of four regions 12, 13, 14, and 15 so that a two-dimensional trough 16, which is lower in light intensity, is implemented in the center of the subsidiary beam 131, as diagrammatically shown in FIG. 8(c).

Figure 9A:
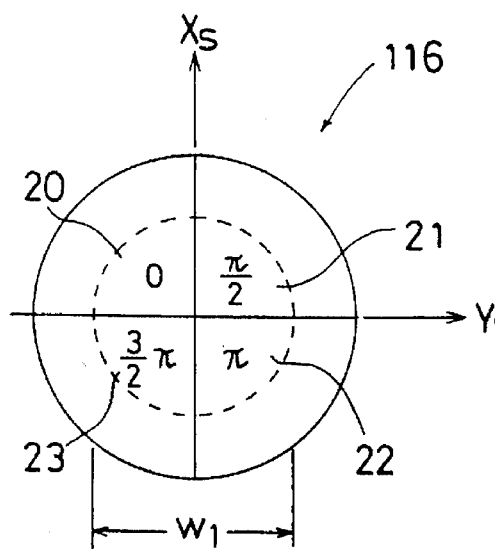
FIG. 9(a) through (d) are a view illustrating another example of the structure of a phase plate for producing the subsidiary beam, which is used in common in all the embodiments of the present invention.
Figure 9B:
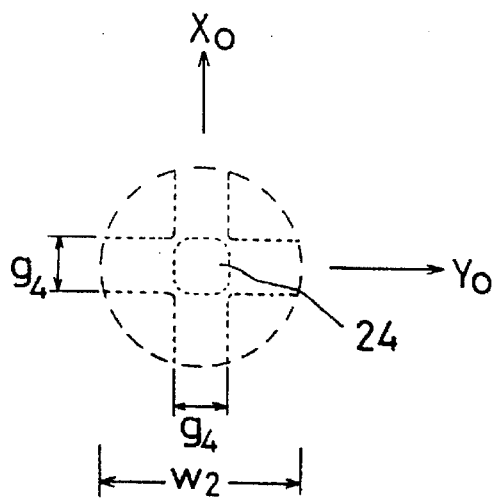

FIG. 9(a) shows another more preferable example of the structure of the polarizing plate 116 (or a non-polarized phase plate), in which four regions 20, 21, 22, and 23 for sequentially providing 0, $\pi/2$, $\pi$, and $(3/2)\pi$ are formed around the optical axis so that the phase difference between every other adjacent regions becomes $\pi$. With the arrangement, the central portion 24 of the image forming plane diagrammatically shown in FIG. 9(b) presents an intensity distribution with a deeper trough than in the case shown in FIG. 8(b).

Figure 9C:
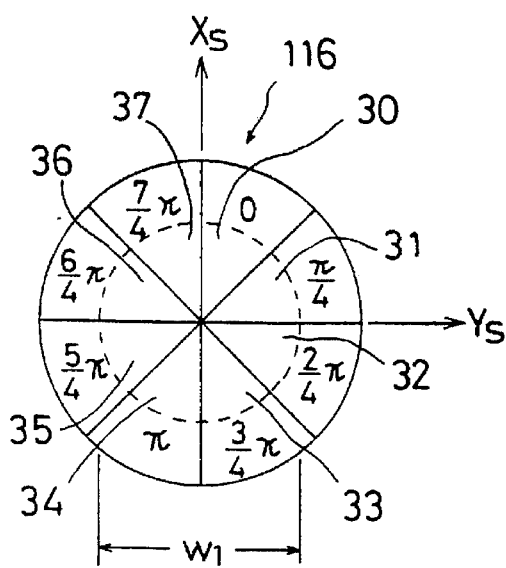
Figure 9D:
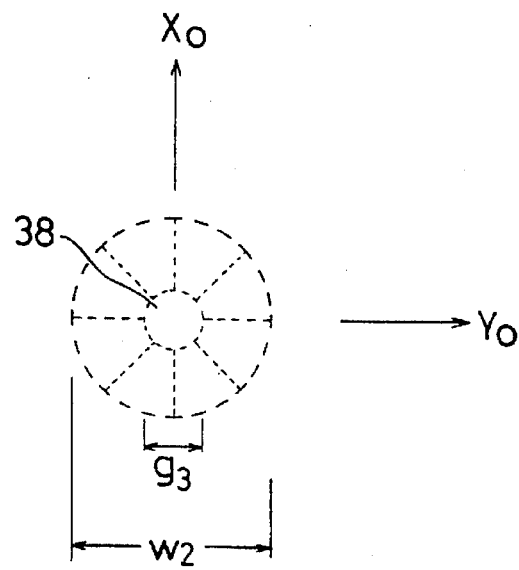

FIG. 9(c) also shows still another example of the structure of the polarizing phase plate 116 (or a non-polarized phase plate), in which the idea described above is further developed and eight regions 30, 31, 32, 33, 34, 35, 36, and 37 are formed by equally dividing the polarizing phase plate 116 around the center thereof. Each adjacent two of the eight regions provides a phase difference of $2\pi/8$ so that the relative phase difference, starting from 0, advances stepwise till it reaches $2\pi$. Accordingly, the phase difference provided by each opposing two of the eight regions (i.e., each two regions in directly opposite positions with an angle of 180° formed therebetween) becomes $\pi$. Thus, by equally dividing the polarizing phase plate 116 into N regions around the center thereof so that a phase difference of $2\pi/N$ is provided by each adjacent two of the N regions, the substantially ideal subsidiary beam 131 which is symmetrical with respect to the optical axis can be formed. In practice, N=8 is adopted so that the central portion 38 of the subsidiary beam 131 on the plane $(X_0, Y_0)$ to be scanned presents a roughly symmetrical distribution with respect to the optical axis.

Figure 10A:
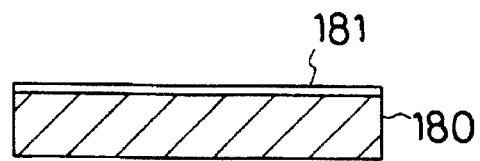
FIG. 10(a) through (e) are a view showing an example of the structure of a polarizing phase plate according to the second and fifth embodiments of the present invention.

FIG. 10(a) to 10(d) show an example of the process of fabricating the polarizing phase plate 116. Initially, as shown in FIG. 10(a), a Tantalum (Ta) film 181 is formed by sputtering to a thickness of 230A (angstrom) on the surface of a substrate 180 (X-plate) made of a crystal of lithium niobate (LiNbO$_3$). The substrate 180 has a thickness of 500 μm and its refractive index is uniaxially anisotropic.

Figure 10B:
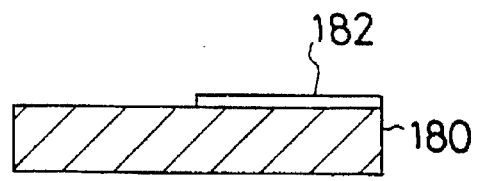

Next, as shown in FIG. 10(b), the Ta film 181 is patterned by photolithography and dry etching, thereby forming a hemispherical proton exchange mask 182.

Figure 10C:
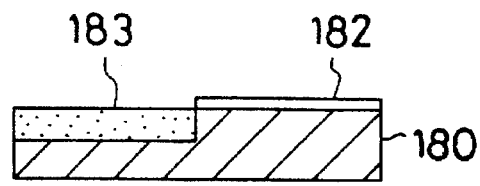

Then, as shown in FIG. 10(c), a heat treatment at a temperature of 260° C. is performed using a pyrophosphoric acid (H$_4$P$_2$O$_7$), so as to form a proton exchange region 183 which is 2.38 μm deep.

Figure 10D:
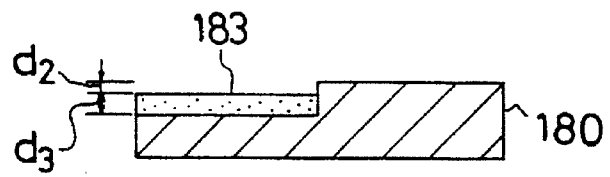
Figure 10E:
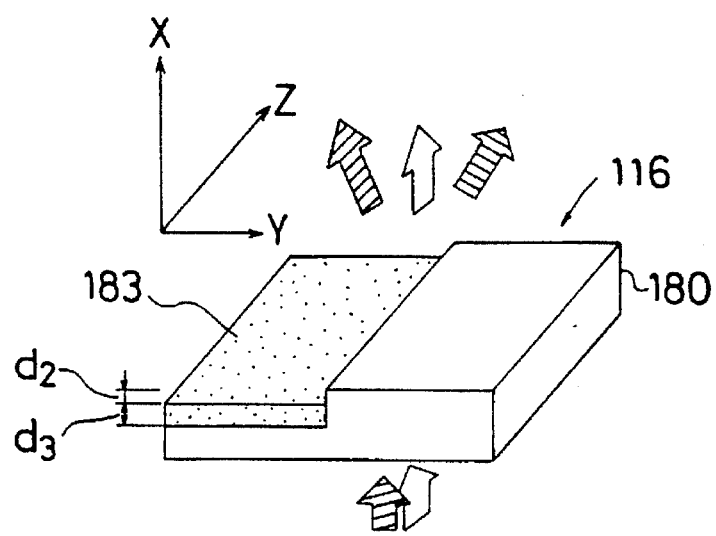

Subsequently, as shown in FIG. 10(d), a phase compensating trench (with a depth of d$_2$) is formed in the proton exchange region 183 by etching using a hydrofluoric acid (HF), thus providing the polarizing phase plate 116 as shown in FIG. 10(e).

The polarizing phase plate 116 thus fabricated serves as a phase plate providing a phase difference varying stepwise in a polarized light component (referred to as an ordinary ray)

having a plane of polarization in the Y-direction, while serving as a uniform transparent substrate with respect to a polarized light component (referred to as an extraordinary ray) having a plane of polarization in the Z-direction.

The requirements for the polarizing phase plate 116 to provide a phase difference to the ordinary ray and to serve as the uniform transparent substrate with respect to the extraordinary ray are generally satisfied if the following equations are satisfied:

$$(2\pi/\lambda) \times \{\Delta n_0 \times d_3 + (1 - n_0) \times d_2\} = -\pi \quad (9)$$

$$(2\pi/\lambda) \times \{\Delta n_e \times d_3 + (1 - n_e) \times d_2\} = 0 \quad (10)$$

where $d_3$ is the thickness of the proton exchange region 183, $d_2$ is the depth of the phase compensating trench, $\lambda$ is the wavelength of incident light, $n_0$ is the refractive index of the ordinary ray with respect to the substrate (proton non-exchange region) 180, $n_e$ is the refractive index of the extraordinary ray with respect to the substrate (proton non-exchange region) 180, $\Delta n_0$ is a reduction in refractive index due to proton exchange with respect to the ordinary ray, and $\Delta n_e$ is an increment in refractive index due to proton exchange with respect to the extraordinary ray.

By way of example, Table 1 shows the refractive indices of the substrate 180 made of lithium niobate and variations in refractive indices thereof due to proton exchange.

TABLE 1

| | SUBSTRATE | VARIATION IN REFRACTIVE INDEX |
| --- | --- | --- |
| ORDINARY RAY (y) | $n_0$ 2.260 | $\Delta n_0$ −0.04 |
| EXTRAORDINARY RAY (x) | $n_e$ 2.177 | $\Delta n_e$ 0.145 |

In FIG. 10, (0, $\pi$) indicates the polarizing phase plate 116 formed as two simply one-dimensional regions. However, it is also possible to fabricate, in accordance with the same process, the polarizing phase plate 116 having the regions shown in FIGS. 8 and 9 so as to implement a two-dimensional super-resolution scanning optical system. In this case, in a region in which another phase difference $\phi$ than $\pi$ is given to the ordinary ray, $-\phi$ is placed on the right side of the equation (9).

Figure 4:
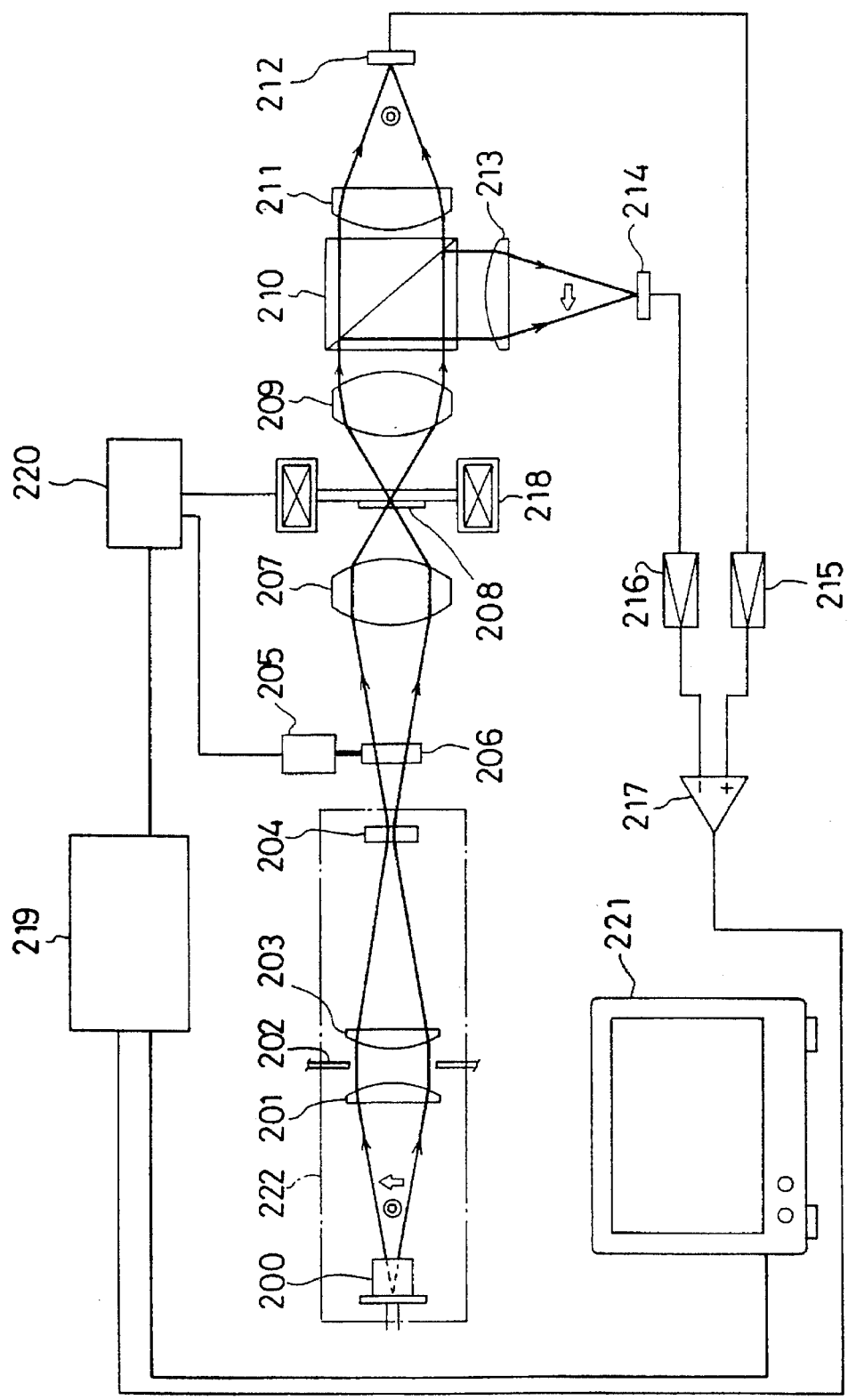
FIG. 4 is a schematic view showing the structure of the super-resolution scanning optical apparatus according to a second embodiment of the present invention.

FIG. 4 schematically shows the structure of the super-resolution scanning optical apparatus according to a second embodiment of the present invention.

As shown in FIG. 4, a light beam which has been emitted from a coherent light source composed of a semiconductor laser sequentially passes through a collimator lens 201, an aperture 202, and a first focusing lens 203, so as to irradiate a polarizing phase plate 204. The polarizing phase plate 204 separates the light beam into a primary beam and a subsidiary beam, the planes of polarization of which are perpendicular to each other. The resulting primary beam and subsidiary beam are then reflected by a galvanometer mirror 206 having a driving unit 205 and focused by an objective lens 207 onto a preparation 208. After transmitted by the preparation 208, the primary beam and subsidiary beam are turned into parallel beams by a condenser lens 209 and their optical paths are separated by a polarizing beam splitter 210, so that the primary beam is focused by a second focusing lens 211 to reach a first optical detector 212, while the subsidiary beam is focused by a third focusing lens 213 to reach a second optical detector 214.

An electrical signal outputted from the first optical detector 212 is amplified by a first amplifier 215, while an electrical signal outputted from the second optical detector 214 is amplified by a second amplifier 216, so that they are operated by a differential amplifier 217.

in FIG. 4, a reference numeral 218 designates an electromagnetic driving means (voice coil), 219 designates a first control means, 220 designates a second control means, and 221 designates a display unit.

The second embodiment is different from the first embodiment in that a beam forming optical system 22 is constituted so as to simply and stably form the subsidiary beam having the principal portion equal in size to that of the primary beam and having the intensity substantially equal to that of the primary beam in the peripheral portion, exclusive of the central portion.

The effect peculiar to the second embodiment is as follows: since the primary beam and subsidiary beam are formed from the light beam emitted from the single coherent light source 200, the intensity of the primary beam is equal to that of the subsidiary beam on the periphery of the main lobe, in contrast to the case where the primary beam and subsidiary beam are formed by means of separate semiconductor lasers and separate optical systems, so that a stable scanning optical system free from displacements of the optical axes can be obtained.

Normally, the semiconductor laser 200 is a commercially available light source which supplies linearly polarized light in a single transverse mode. In the second embodiment, the plane of polarization is set at an angle of about 45° with respect to the paper face. With the setting, polarized beam components obtained by multiplying the direction parallel to the paper face and the direction vertical to the paper face by sin45°, respectively. On the other hand, the crystal axis of the polarizing phase plate 204 (see FIG. 10(e)) is set so that the Z-Y plane coincides with the paper face, thereby forming the primary beam (ordinary ray) and the subsidiary beam (extraordinary ray). It is also possible in the second embodiment to use the polarizing phase plate having the phase regions shown in FIGS. 8 and 9. The second embodiment provides a two-dimensional super-resolution scanning optical system which is extremely stable in general, and a super-resolution scanning optical apparatus using the optical system.

In the second embodiment, even when the aperture 202 is slightly reduced in size so that the beam size on the polarizing phase plate 204 surpasses 1.5 times the beam size of the diffraction limited of the objective lens 207, its effect is not particularly changed. This is because, as is clear from the principle of the present invention, the main lobes of the primary beam and subsidiary beam have the same profile except in the central portion, and even if a slight difference exists therebetween, the intensity of the primary beam and that of the subsidiary beam are offset by differential detection.

Figure 5:
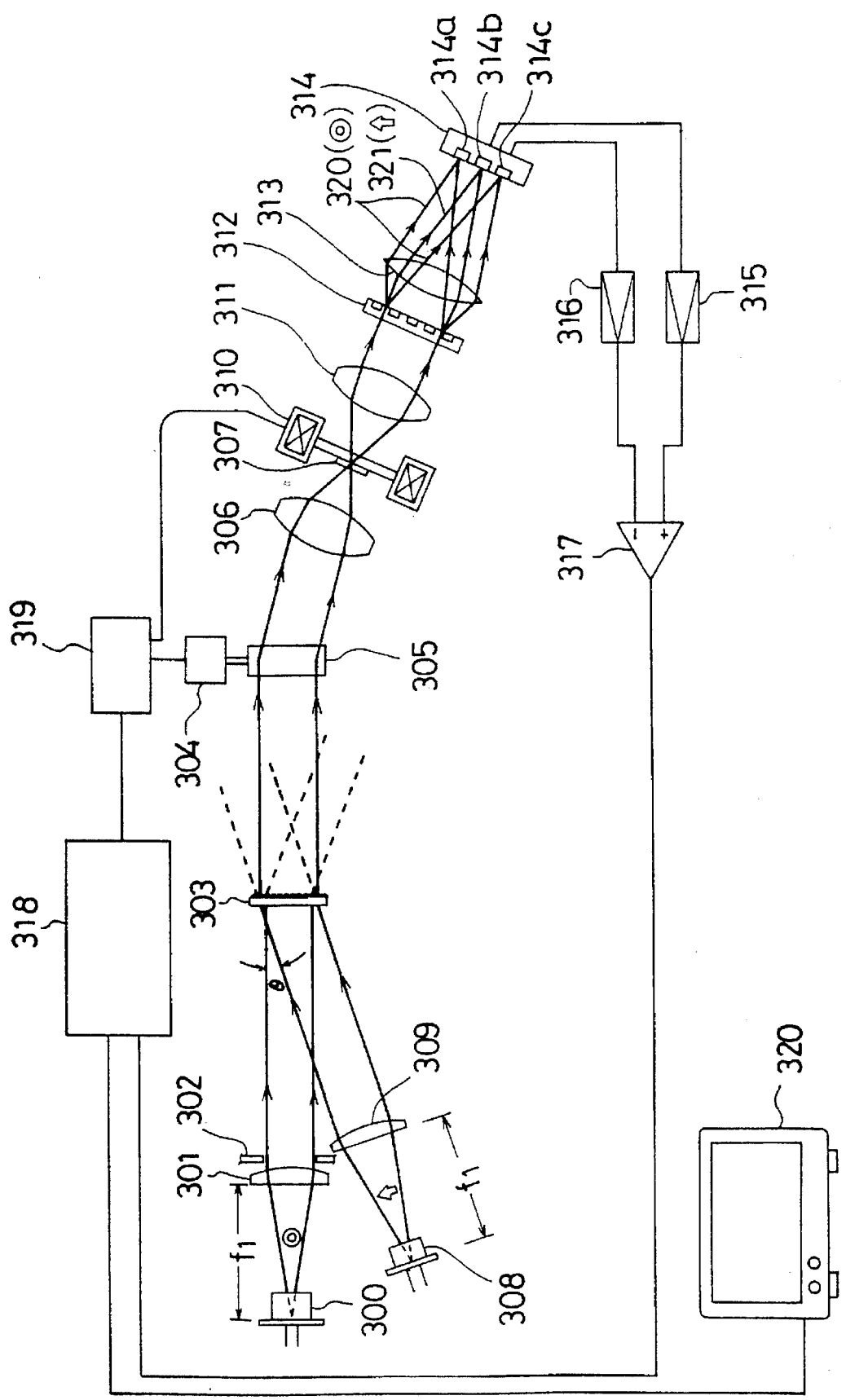
FIG. 5 is a schematic view showing the structure of the super-resolution scanning optical apparatus according to a third embodiment of the present invention.

FIG. 5 schematically shows the structure of the super-resolution scanning optical apparatus according to a third embodiment of the present invention.

A primary beam that has been emitted from a first coherent light source, composed of a semiconductor laser, is turned into parallel beams upon passing through a collimator lens 301 and the aperture 302. Thereafter, the resulting parallel beams further pass through a diffracting device 303, are incident upon and reflected by a galvanometer mirror 305, and then focused by an objective lens 306 onto the focal plane of a preparation 307.

A subsidiary beam that has been emitted from a second coherent light source 308, composed of a semiconductor laser, and has a plane of polarization perpendicular to that of the primary beam passes through a second collimator lens 309 and the diffractive optical element (hologram) 303, is incident upon and reflected by the galvanometer mirror 305, and then focused by the objective lens 306 onto the preparation 307.

The primary beam and subsidiary beam transmitted by the preparation 307 pass through a condenser lens 311 and a polarization separation optical device 312, are focused by a focusing lens 313, and reach a photo-detector 314.

In the third embodiment, the galvanometer mirror 305, a driving means 304 for the galvanometer mirror 305, and the electromagnetic driving means (voice coil) 310 are arranged so that the primary beam and subsidiary beam scan the preparation 307 placed on the plane to be scanned in two dimensions, similarly to the first and second embodiments. There are also arranged a first amplifier 315, a second amplifier 316, a differential amplifier 317, a first control means 318, a second control means 319, and a display unit 320, similarly to the first and second embodiments.

The third embodiment is different from the first and second embodiments in that it uses the diffractive optical element 303 the optical system for forming the primary and subsidiary beams and the polarization separation optical device 312 composed of a diffractive optical element using a uniaxially anisotropic material.

A description will be given to the diffractive optical element 303, which is the first characteristic of the third embodiment.

The diffractive optical element 303 is a holographic optical element wherein a hologram is obtained by irradiating any one of the polarizing phase plates (or conventional phase plates) 116 described above with reference to FIGS. 8 and 9 with a coherent beam in specified size, collimating the transmitted beam, and overlapping the above coherent beam (an object beam) and a reference beam which can interfere with the object beam. In the process of fabricating the holographic optical element, the same effect can be obtained if a non-polarizing phase plate is used instead, as described above.

A description will be given to the above holographic optical element with reference to FIG. 3.

The polarizing phase plate 116 and two points 170 and 171 (in effect, slits with fine apertures) are irradiated with parallel coherent beams at a wavelength of λ, thereby introducing a reference beam 176 onto the focal plane (ξ-axis)) of the Fourier transform lens (convex lens) 150 so as to record an interference pattern on a photosensitive material. Since the holographic technique for producing the diffracted wavefront from a given object by overlapping the independent reference beam onto the object beam has been well-known, the detailed description thereof is omitted here. In this case, although a hologram is recorded using the wavelength λ, the incident angle θ of the reference; beam, and a lens focal distance $f_1$, it is also possible to use another wavelength $\lambda_0$ and another lens focal distance $f_0$. In this case, the incident angle $\theta_0$ of the reference beam is set so as to satisfy $\sin\theta_0/\sin\theta=\lambda_0/\lambda$ and the focal distance of the second collimator lens 309 shown in FIG. 5 is set so as to satisfy $f_1=f_0.\lambda_0/\lambda$. The other parameters of a holographic recording/reproducing optical system can also be set so as to equivalently obtain the same effect.

Thus, the primary beam and subsidiary beam of FIG. 5 are formed on the same axis by constituting the hologram of the polarizing phase plate 116 so that it also functions as a beam splitter. However, it is also possible to design and fabricate the hologram of the polarizing phase plate 116 by a technology based on computer synthesis. In this case, the polarizing phase plate 116 divided into N regions as described above with reference to FIG. 9 can be calculated from an ideal model in which N→∞. Based on the calculation result, there can be obtained a relief-type hologram, which can be first produced as a mask pattern by means of electronic beam drawing or laser beam drawing to be used in lithographic process and which can secondary be duplicated by some stamping process.

Next, a description will be given to a polarization separation optical device 312, which is the second characteristic of the third embodiment.

The application of a polarizing holographic device of the same type has been disclosed in e.g., U.S. Pat. No. 5,062, 098. On the other hand, another substrate material such as a liquid-crystal device having polarizing anisotropy can also be used.

Among others, the method used in fabricating the polarizing holographic device according the third embodiment described above is particularly advantageous in terms of fabrication accuracy and cost, as will be described below. That is, in the device in which a portion of lithium ($Li^+$) in lithium niobate (hereinafter referred to as LN) has been substituted by proton $H^+$ the refractive index with respect to the extraordinary ray undergoes a large variation ($\Delta n_e$) in the region in which proton exchange has been achieved, as shown in Table 1, so that the device functions as a phase-type diffraction grating having a large diffracting effect with respect to the extraordinary ray.

However, in the region in which proton exchange has been achieved, the refractive index with respect to the ordinary ray also undergoes a slight variation ($\Delta n_o$). Thus, in the diffraction grating in which LN has been substituted by proton, the refractive index with respect to the extraordinary ray and the refractive index with respect to the ordinary ray undergo simultaneous variations and cannot perform the above functions of polarization and separation completely, so that it becomes necessary to add certain phase compensation. In a conventional method (A. Ohba et al., Jap. Appl. Phys., 28(1989)359), the phase difference in the ordinary ray is compensated by a dielectric film formed in the proton exchanged region. Accordingly, additional steps of depositing and patterning the dielectric are required in fabricating the diffraction grating, while an improved accuracy is required in alignment.

Figure 11A:
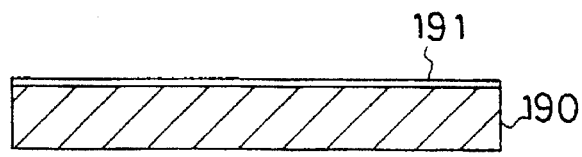
FIG. 11(a) through (e) are a schematic view illustrating an example of the structure of a polarizing diffraction grating according to a third embodiment of the present invention.
Figure 11B:
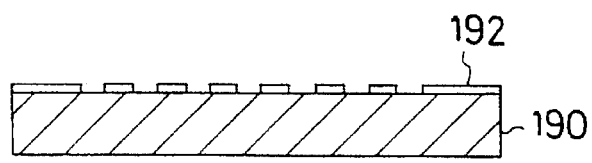
Figure 11C:
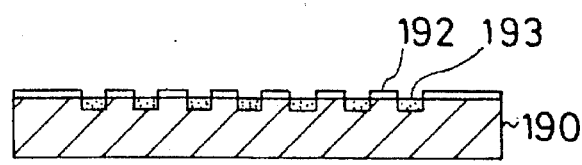
Figure 11D:
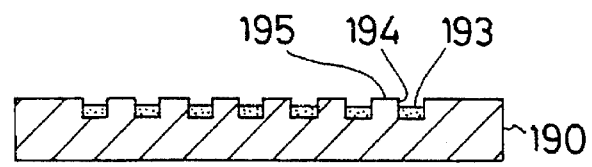
Figure 11E:
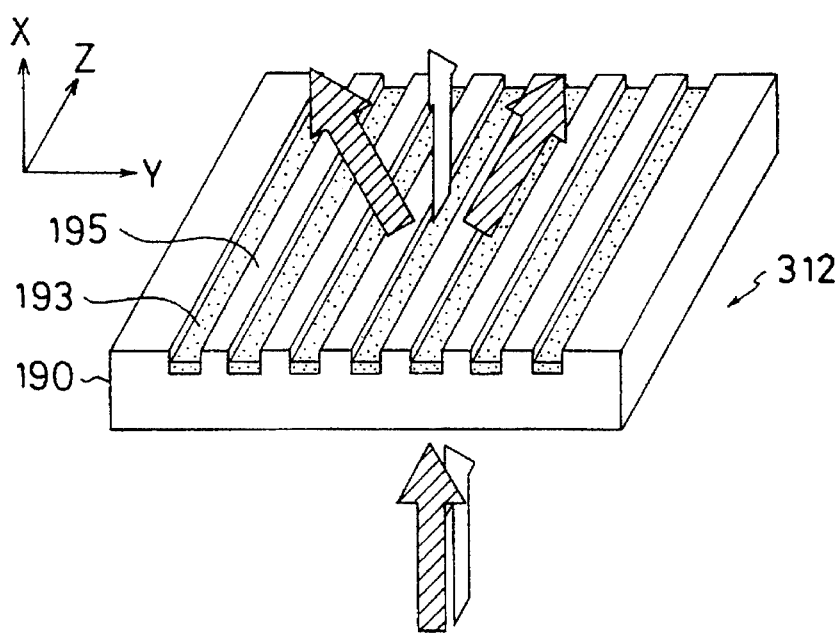
Figure 12:
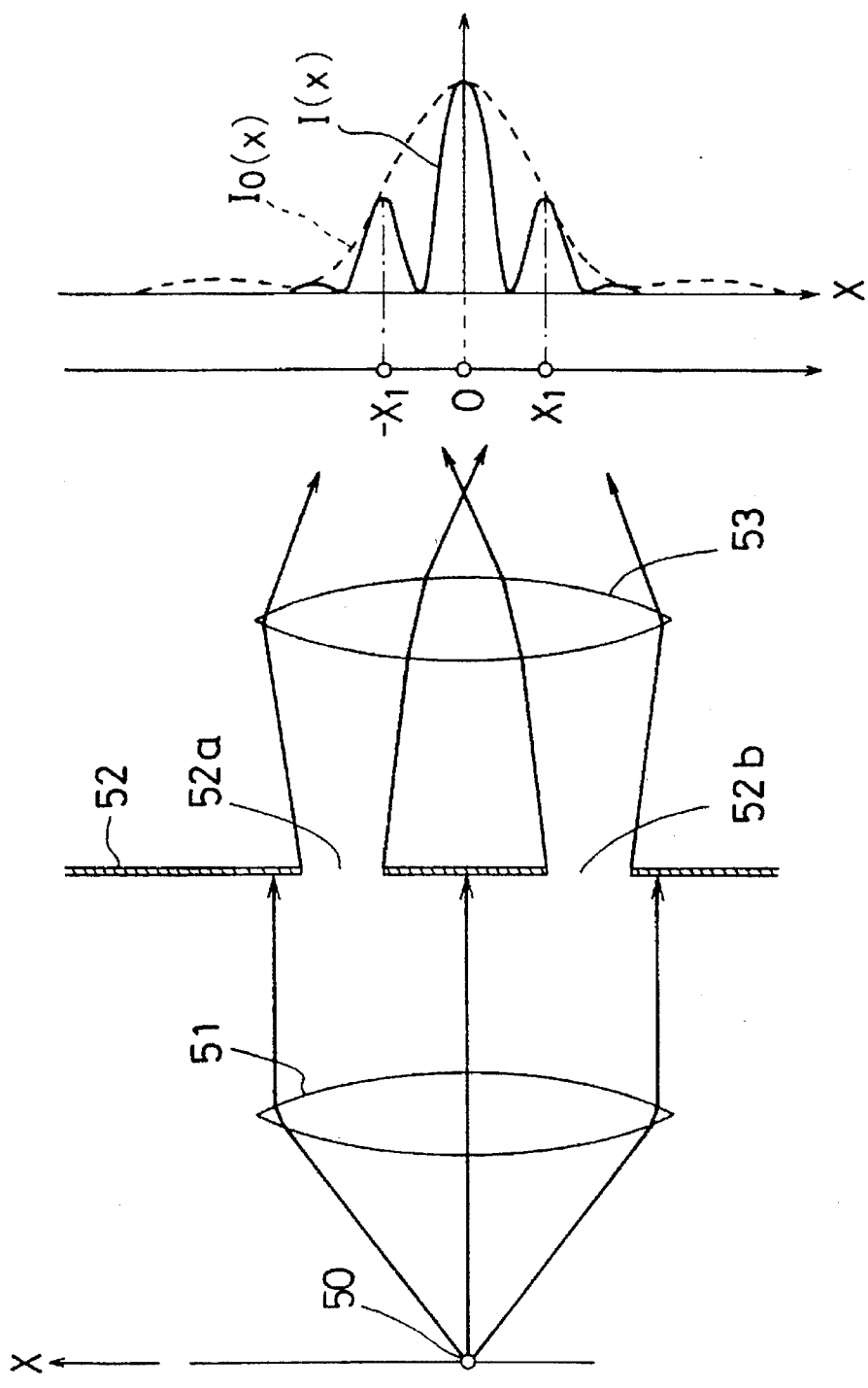
FIG. 12 is a schematic view illustrating the structure of a conventional super-resolution scanning optical system using an annular aperture.

The polarization separation optical device 312 diagrammatically shown in FIG. 11(e) is formed as a diffraction grating with polarizing anisotropy in which proton exchanged regions 193 are formed in a grid on the surface of a substrate (X plate) 190. For phase compensation, only the proton exchanged regions 193 are subjected to etching (hereinafter referred to as phase compensation trenches), conversely to the prior art, thereby offsetting the phase difference given by the proton exchanged regions 193 and proton non-exchanged regions 195 to the extraordinary beam passing through the proton exchanged regions 193 after etching. As a result, the refractive index of the phase compensation trench becomes 1 (=refractive index of air), which is smaller than the refractive index of the substrate 190 (refractive index with respect to ordinary ray: $1-n_o$, refractive index with respect to extraordinary ray: $1-n_e$)). Accordingly, when the phase difference is eliminated by offsetting the increment ($\Delta n_e$) due to proton exchange with respect to the extraordinary ray, the refractive index with respect to the ordinary ray is increased by the reduction due to proton substitution ($\Delta n_o$) and by the reduction due to phase compensation, so that the phase difference advances conversely. The conditions for diffracting the ordinary ray with the maximum efficiency and not diffracting the extraordinary ray are given by the above equations (9) and (10).

Below, a description will be given to the method of fabricating the polarization separation optical device 312.

The polarization separation optical device 312 can easily be fabricated using the processes such as of photolithography and proton exchange, similar to those of the polarizing phase plate 116 shown in FIG. 10. That is, as shown in FIG. 11(a), a Ta film 191 is formed on a substrate 190 made of a crystal of a lithium niobate (LiNb0$_3$), which is a uniaxially anisotropic material. Next, as shown in FIG. 11(b), the Ta film 191 is patterned by photolithography and dry etching, thereby forming a grid-like proton exchange mask 192. Subsequently, as shown in FIG. 11(c), a heat treatment at a temperature of 260° C. with a pyrophosphoric acid is performed using the grid-like proton exchange mask 192, thereby forming the proton exchange regions 193 each having a depth of 2.38 μm, as shown in FIGS. 11(d) and 11(e). Since etching with a hydrofluoric acid selectively proceeds with respect to the proton exchange region 193, while it does not proceed with respect to the substrate 190, the phase compensation trenches 194 can be formed by utilizing the selectivity of the etching without need of any alignment. As the depth of the phase compensation trench 194 increases, the phase difference in the ordinary ray also advances, so that the efficiency $\eta_{o1}$ of the first-order diffracted ray of the ordinary ray is increased, while the transmittance $\eta_{oo}$ (efficiency of the zero-order diffracted ray) is reduced. With the extraordinary ray, on the other hand, the increase in refractive index of the proton exchange region 193 is offset by the phase compensation trench 194, so that the efficiency $\eta_{e1}$ of the first-order diffracted ray of the extraordinary ray is reduced, while the transmittance is increased. The transmittance $\eta_{eo}$ of the extraordinary ray becomes minimum when the depth of etching is 0.13 μm. The extinction ratio of the transmitted ray (extraordinary ray) is 24 dB, while the extinction ratio of the diffracted ray (ordinary ray) is 17 dB, so that excellent characteristics are obtained.

Thus, in the polarization separation optical device 312, the primary beam 320 is detected by the first and third optical detecting units 314a and 314c shown in FIG. 5, while the subsidiary beam 321 is detected by the second optical detecting unit 314b shown in FIG. 5, with excellent extinction ratios. The first optical detecting unit 314a is electrically connected to the third optical detecting unit 314c , so that electrical signals are added up.

Figure 6:
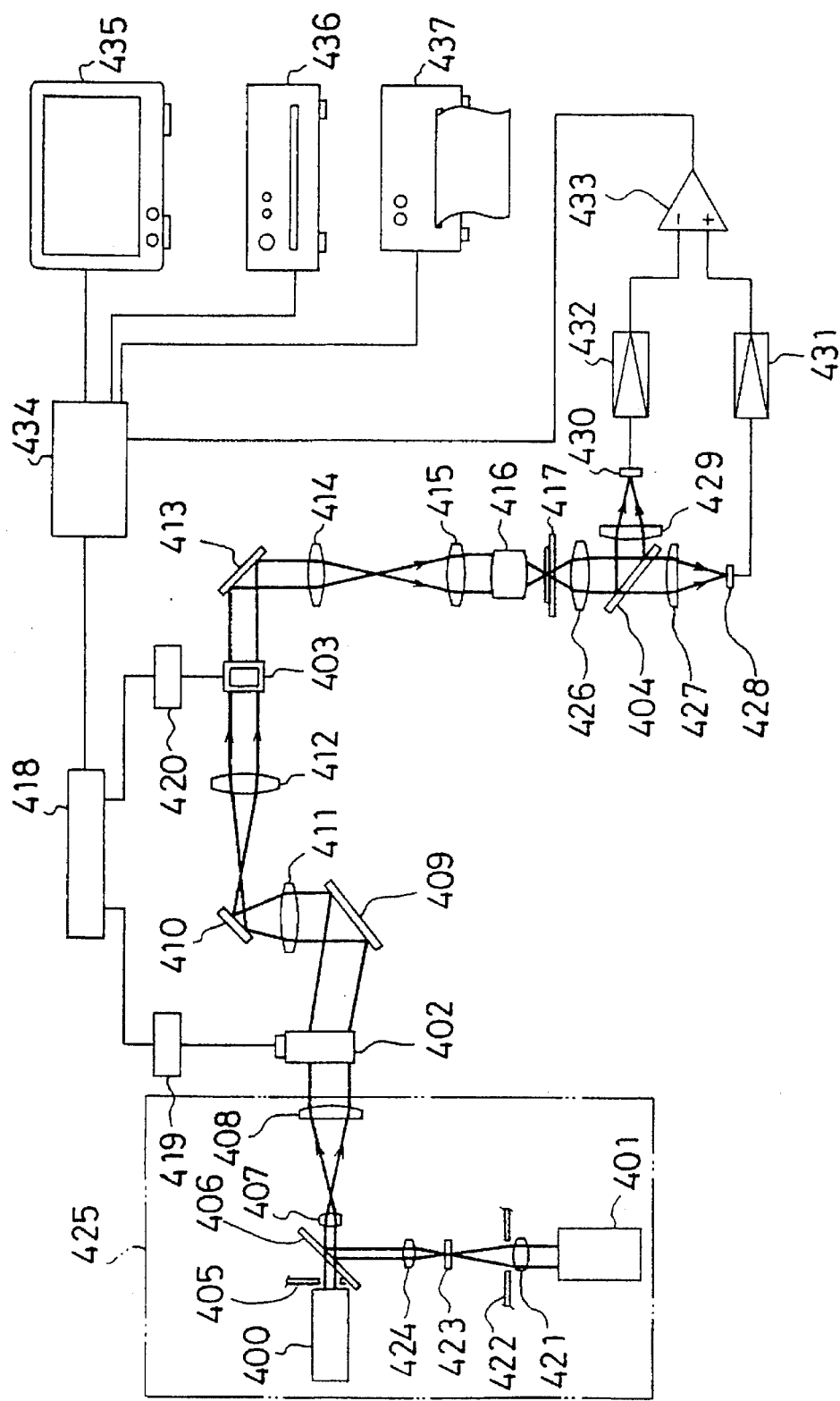
FIG. 6 is a schematic view showing the structure of the super-resolution scanning optical apparatus according to a fourth embodiment of the present invention.

FIG. 6 schematically shows the structure of the super-resolution scanning optical apparatus according to a fourth embodiment of the present invention.

The fourth embodiment is different from the first to third embodiments in that first and second coherent light sources 400 and 401 for emitting coherent beams of different wavelengths are used and that a combination of first and second acoust-optical deflectors 402 and 403, which enable high-speed optical deflection, are used as a two-dimensional optical deflecting means (see Tatsuro Suzuki and Yoshiaki Horikawa, "Development of a real-time scanning laser microscope for biological use," Appl. Opt. Vol. 25, No. 22, pp. 4115–4121, 1986). In addition to that, a wavelength separation optical system composed of a multi-layer interference filter 404, not a polarization separation optical system, is used as a means for performing separation between the primary beam and the subsidiary beam.

As shown in FIG. 6, the primary beam composed of a first coherent beam at a wavelength of λ is emitted from the first coherent light source 400, sequentially passes through a first aperture 405 and a narrow-band optical filter (band-pass filter) 406 coated with a dielectric multi-layer film and is focused by a first focusing lens 407. Thereafter, the focused primary beam is turned into parallel beams by a first collimator lens 408, which are incident upon the first acoust-optical deflector 402. The primary beam which was turned into a diffracted beam (deflected beam) upon passing through the first acoust-optical deflector 402 is made incident upon the second acoust-optical deflector 403 via mirrors 409 and 410 and via relay-lens optical systems 411 and 412. With the combination of the first and second acoust optical deflectors 402 and 403 and the relay-lens optical systems 411 and 412, the primary beam deflected at high speed in the X-Y directions in two dimensions is reflected by the mirror 413, passes through a second focusing lens 414 and a second collimator lens 415, and scans a preparation 417, which is the plane to be scanned, through an objective lens 416. The first and second acoust optical deflectors 402 and 403 are supplied with saw-tooth waves at 60 Hz (Y-direction) and at 15.75 KHz (X-direction) from a first control means 418 via diving units 419 and 420, respectively, thereby performing beam scanning at a video rate in accordance with the standard NTSC system. Consequently, a magnified image is displayed in real time on a CRT screen, so that a test sample can be observed by arbitrarily adjusting a focus on a desired portion of the test sample (a preparation sample in the fourth embodiment).

Next, a description will be given to another optical system for generating the subsidiary beam. The subsidiary beam composed of a second coherent beam, which is emitted from the second coherent light source 401 and has a wavelength of (λ+Δλ) (when λ=780 nm, Δλ is approximately 5 nm) slightly different from the wavelength of the first coherent beam, passes through a third focusing lens 421 and a second aperture 422, and is focused onto a phase plate 423. On passing through the phase plate 423, the subsidiary beam becomes a light beam which presents an intensity distribution in which the vicinity of the optical axis is depressed by the effect of the phase plate 423, as shown in FIG. 8 or 9. The resulting light beam is made incident upon the narrow-band optical filter 406 by a third collimator lens 424, so that it becomes coaxial with the primary beam. The subsidiary beam adjusts the respective devices of a forming optical system 425 so that it becomes coaxial with the primary beam and that its main lobe becomes equal in size to the main lobe of the primary beam.

The primary beam and subsidiary beam that have passed through the preparation 417 and a fourth collimator lens 426 are subjected to wavelength separation by the interference filter 404 composed of the multi-layer film. Thereafter, the primary beam passes through a fourth focusing lens 427 to be subjected to photoelectrical conversion by a first photodetector 428, while the subsidiary beam passes through a fifth focusing lens 429 to be subjected to photoelectrical conversion by a second photo-detector 430. The electrical signals outputted from the first and second photo-detectors 428 and 430 are amplified by first and second amplifiers 431 and 432, calculated by a differential amplifier 433, and then inputted to a second control means 434, similarly to the first embodiment. In a fifth embodiment, an optical disk memory 436 and a video printer 437 in addition to the display unit 435 are connected to the second control means 434.

According to the fourth embodiment, high-speed deflection is easily performed and the first and second acoust-optical deflectors 402 and 403 are easily designed, since the primary beam or subsidiary beam can selectively be polarized. In the case of using polarized beams perpendicular to each other as in the first to third embodiments, although a desired polarized beam can be used by selectively using a TeO$_2$ glass as a medium material, the polarization direction is disadvantageously determined in the first and second acoust-optical deflectors 402 and 403 using a crystal medium.

Figure 7:
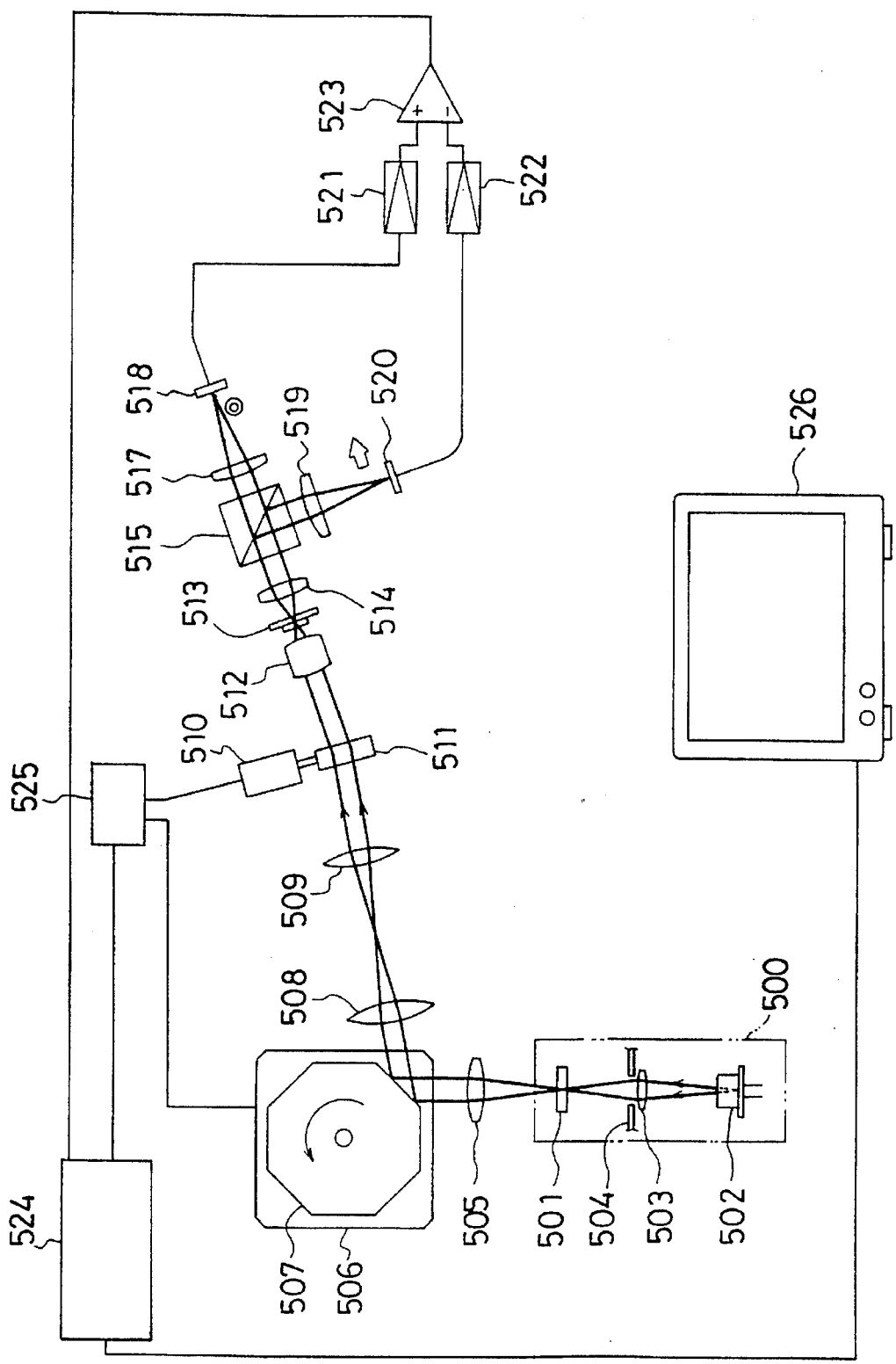
FIG. 7 is a schematic view showing the structure of the super-resolution scanning optical apparatus according to a fifth embodiment of the present invention.

FIG. 7 schematically shows the structure of the super-resolution scanning optical apparatus according to the fifth embodiment of the present invention.

in the fifth embodiment, a principal/subsidiary beam generating optical system 500 uses a polarizing phase plate 501, similarly to the principal/subsidiary beam generating optical system 222 in the second embodiment, so that stable beam formation can be performed by a compact optical system.

As shown in FIG. 7, the light beam emitted from a coherent light source 502 passes through a first focusing lens 503 and an aperture 504 and irradiates the polarizing phase plate 501. The polarizing phase plate 501 separates the light beam into primary and subsidiary beams, which then irradiate a polygon mirror 507 having a driving unit 506 via a first collimator lens 505. The primary beam and subsidiary beam reflected by the polygon mirror 507 pass through a second focusing lens 508 and a second collimator lens 509, are reflected by a galvanometer mirror 511 having a driving unit 510, and then focused onto a preparation 513 by an objective lens 512. The primary beam and subsidiary beam transmitted by the preparation 513 are turned into parallel beams by a third collimator lens 514 and have their optical paths separated by a polarizing beam splitter 515 from each other. Consequently, the primary beam is focused by a third focusing lens 517 to reach a first optical detector 518, while the subsidiary beam is focused by a fourth focusing lens 519 to reach a second optical detector 520.

In the fifth embodiment, a scanning speed of 15.75 KHz (X-direction) is achieved using the polygon mirror 507 as a means for performing high-speed deflection and the driving unit 506 thereof, while scanning is conducted at 60 Hz in the Y-direction using the galvanometer mirror 511 and the driving unit 510 thereof.

The electrical signal outputted from the first optical detector 518 is amplified by a first amplifier 521 and the electrical signal outputted from the second optical detector 520 is amplified by a second amplifier 522, so that the two electrical signals are calculated by a differential calculator 523. A first control means 524, a second control means 525, and a display unit 526 operate in the same manner as in the first embodiment.

Since the respective embodiments of the present invention have been described thus far in detail, the structure and functions of the super-resolution scanning optical apparatus of the present invention, which has implemented the beam size about half the beam size of the diffraction limited in a conventional scanning optical apparatus, will be clearly understood.

The focal depth $\delta$ of the optical system in the present invention is given by the following equation in relation to the wavelength $\lambda$ of light and to the numerical aperture NA of the objective lens:

$$\delta = \alpha \times (\lambda/(NA)^2) \quad (11)$$

where $\alpha$ is a constant.

A remarkable effect obtainable from all the embodiments of the present invention is that, since super-resolution is achieved by the differential calculation processing after individually detecting the primary beam and the subsidiary beam, the focal depth never becomes shallower than the focal depth of the primary beam. On the contrary, the present invention achieves a significant effect that, since the differential calculation processing is performed between the light intensities of the primary and subsidiary beams, the focal depth on the basis of the resolution of the diffraction limited of the objective lens is further increased.

The application of the super-resolution scanning optical apparatus according to the present invention is not limited to the scanning laser microscope described above in the individual embodiments. The super-resolution scanning optical apparatus is also applicable to other scanning optical apparatus which read information on patterns by beam scanning. In either case, there can be achieved a significant effect of enhancing a resolving power to half the beam size of the diffraction limited of Rayleigh, which is given by the numerical aperture of the objective lens and the wavelength of light in use.

We claim:

1. A super-resolution scanning optical apparatus comprising:

a first coherent light source for emitting a first coherent beam serving as a primary beam;

a second coherent light source for emitting a second coherent beam which has either a plane of polarization perpendicular to the plane of polarization of said first coherent beam or a wavelength different from the wavelength of said first coherent beam;

a phase plate for receiving said second coherent beam and emitting a subsidiary beam which has an intensity distribution in which peak values are placed at least on both sides of the center of the subsidiary beam on a plane perpendicular to an optical axis and the principal portion of the subsidiary beam is equal in size to the principal portion of the primary beam;

a focusing means for superimposing the primary beam emitted from said first coherent light source and the subsidiary beam emitted from said phase plate upon each other and focusing, as a minute size light beam, each of the primary beam and the subsidiary beam onto a plane to be scanned;

a scanning means for scanning said plane to be scanned with a light beam composed of the primary beam and the subsidiary beam being superimposed upon each other;

a light separating means for receiving the light beam transmitted or reflected by said plane to be scanned, separating said light beam into the primary beam and the subsidiary beam through polarization separation or wavelength separation, and emitting them;

an optical detecting means for individually detecting the intensity of the primary beam and the intensity of the subsidiary beam and outputting a light intensity signal; and a calculating means for calculating, based on the light intensity signal outputted from said optical detecting means, a super-resolution scanning signal and outputting it.

2. A super-resolution scanning optical apparatus according to claim 1, further comprising:

an output means for displaying, printing, or storing information on an image on said plane to be scanned; and a control means for receiving the super-resolution scanning signal outputted from said calculating means and controlling said output means so that it displays, prints, or stores the information on the image on said plane to be scanned.

3. A super-resolution scanning optical apparatus according to claim 1, wherein
said first and second coherent light sources are a pair of linearly polarized lasers which are arranged so that their planes of polarization are perpendicular to each other.

4. A super-resolution scanning optical apparatus according to claim 1, wherein
said light separating means consists of a substrate the refractive index of which is uniaxially anisotropic and a polarizing holographic device or a polarizing diffraction grating so as to serve as a polarization separating means for separating said light beam into said primary beam and said subsidiary beam through polarization separation.

5. A super-resolution scanning optical apparatus according to claim 1, wherein
said light separating means is composed of a multi-layer dielectric filter so as to serve as a wavelength separating means for separating said light beam into said primary beam and said subsidiary beam through wavelength separation.

6. A super-resolution scanning optical apparatus according to claim 1, wherein
said phase plate is divided into N (N is an integer equal to or more than 2) regions around the center thereof, said N regions providing a relative phase difference advancing stepwise in the sequence of 0, $2\pi/N$, $(2\pi/N) \times 2$, $(2\pi/N) \times 3$, . . . , and $(2\pi/N).(N-1)$ to the second coherent beam emitted from said second coherent light source and emits the second coherent beam passing through said N regions as said subsidiary beam.

7. A super-resolution scanning optical apparatus according to claim 1, wherein
said scanning means has a pair of acoust-optical deflectors for deflecting said primary beam and said subsidiary beam in two directions perpendicular to each other on the plane to be scanned.

8. A super-resolution scanning optical apparatus, comprising:
a coherent light source for emitting a coherent beam;
a polarizing phase plate for receiving the coherent beam emitted from the coherent light source, separating the coherent beam into a primary beam and a subsidiary beam which has a plane of polarization perpendicular to the plane of polarization of the primary beam and an intensity distribution in which peak values are placed at least on both sides of the center of said primary beam and the principal portion of the subsidiary beam is equal in size to the principal portion of said primary beam, and transmitting the primary beam and the subsidiary beam;
a focusing means for superimposing the primary beam and the subsidiary beam transmitted through said polarizing phase plate upon each other and focusing, as a minute size light beam, each of the primary beam and the subsidiary beam onto a plane to be scanned;
a scanning means for scanning said plane to be scanned with a light beam composed of the primary beam and the subsidiary beam being superimposed upon each other;
a light separating means for receiving the light beam transmitted or reflected by said plane to be scanned, separating said beam into the primary beam and the subsidiary beam through polarization separation, and transmitting them;
a photo-detecting means for individually detecting the intensity of the primary beam and the intensity of the subsidiary beam and outputting a light intensity signal; and
a calculating means for calculating, based on the light intensity signal outputted from said photo-detecting means, a super-resolution scanning signal and outputting it.

9. A super-resolution scanning optical apparatus according to claim 8, further comprising:
an output means for displaying, printing, or storing information in an image on said plane to be scanned; and
a control means for receiving the super-resolution scanning signal outputted from said calculating means and controlling said output means so that it displays, prints, or stores the information on the image on said plane to be scanned.

10. A super-resolution scanning optical apparatus according to claim 8, wherein
said light separating means consists of a substrate the refractive index of which is uniaxially anisotropic and a polarizing holographic device or a polarizing diffraction grating so as to serve as a polarization separating means for separating said light beam into said primary beam and said subsidiary beam through polarization separation.

11. A super-resolution scanning optical apparatus according to claim 8, wherein
said polarizing phase plate separates the coherent beam emitted from said coherent light source into an optical component having a plane of polarization in one direction and an optical component having a plane of polarization in another direction, said planes of polarization being perpendicular to each other, emits, as said primary beam, said optical component having the plane of polarization in one direction, has a first region which does not provide any relative phase difference to the optical component having the plane of polarization in said another direction and a second region which provides a relative phase difference of $\pi$ to the optical component having the plane of polarization in said another direction, and emits, as said subsidiary beam, the optical component passing through said first and second regions.

12. A super-resolution scanning optical apparatus according to claim 11, wherein
said first and second regions are formed around the center of said polarizing phase plate in four regions so that the two first regions alternate the two second regions.

13. A super-resolution scanning optical apparatus according to claim 8, wherein
said polarizing phase plate separates the coherent beam emitted from said coherent light source into an optical component having a plane of polarization in one direction and an optical component having a plane of polarization in another direction, said planes of polarization being perpendicular to each other, emits the optical component having the plane of polarization In said one direction without providing any relative phase difference thereto, has N (N is an integer equal to or more than 2) regions around the center thereof which provides a relative phase difference advancing in the sequence of 0, $2\pi/N$, $(2\pi/N) \times 2$, $(2\pi/N) \times 3$ . . . , and $(2\pi/N).(N-1)$ to the optical wave component having the plane of polarization in said another direction, and transmits, as said subsidiary beam, the optical wave component passing through said N regions.

14. A super-resolution scanning optical apparatus comprising:

a first coherent light source for emitting a first coherent beam serving as a primary beam;

a second coherent light source for emitting a second coherent beam which has either a plane of polarization perpendicular to the plane of polarization of said first coherent beam or a wavelength different from the wavelength of said first coherent beam;

a holographic optical element for receiving said second coherent beam and emitting a subsidiary beam which has an intensity distribution in which peak values are placed at least on both sides of the subsidiary beam on a plane perpendicular to an optical axis and the principal portion of the subsidiary beam is equal in size to the principal portion of primary beam;

a focusing means for superimposing the primary beam emitted from said first coherent light source and the subsidiary beam transmitted through said holographic optical element upon each other and focusing, as a minute size light be each of the primary beam and the subsidiary beam onto a plane to be scanned;

a scanning means for scanning said plane to be scanned with a light beam composed of said primary beam and said subsidiary beam being superimposed upon each other;

a light separating means for receiving the light beam transmitted or reflected by said plane to be scanned, separating said light beam into the primary beam and the subsidiary beam through polarization separation or wavelength separation, and transmitting them;

a photo-detecting means for individually detecting the intensity of the primary beam and the intensity of the subsidiary beam and outputting a light intensity signal; and a calculating means for calculating, based on the light intensity signal outputted from said optical detecting means, a super-resolution scanning signal and outputting it.

15. A super-resolution scanning optical apparatus according to claim 14, further comprising:

an output means for displaying, printing, or storing information on an image on said plane to be scanned; and a control means for receiving the super-resolution scanning signal outputted from said calculating means and controlling said output means so that it displays, prints, or stores the information on the image on said plane to be scanned.

16. A super-resolution scanning optical apparatus according to claim 14, wherein said first and second coherent light sources are a pair of linearly polarized lasers which are arranged so that their planes of polarization are perpendicular to each other.

17. A super-resolution scanning optical apparatus according to claim 14, wherein said light separating means consists of a substrate the refractive index of which is uniaxially anisotropic and a polarizing holographic device or a polarizing diffraction grating so as to serve as a polarization separating means for separating said light beam into said primary beam and said subsidiary beam through polarization separation.

18. A super-resolution scanning optical apparatus according to claim 14, wherein said light separating means is composed of a multi-layer dielectric filter so as to serve as a wavelength separating means for separating said light beam into said primary beam and said subsidiary beam through wavelength separation.

19. A super-resolution scanning optical apparatus according to claim 14, wherein said scanning means has a pair of acoust optical deflectors for deflecting said primary beam and said subsidiary beam in two directions perpendicular to each other on the plane to be scanned.

* * * * *

UNITED STATES PATENT AND TRADEMARK OFFICE
CERTIFICATE OF CORRECTION

PATENT NO. : 5,625,613
DATED : April 29, 1997
INVENTOR(S) : KATO et al.

It is certified that error appears in the above-identified patent and that said Letters Patent is hereby corrected as shown below:

Col. 23, line 22: Change "be" to read --beam--

Signed and Sealed this

Eighth Day of December, 1998

Attest:

BRUCE LEHMAN

*Attesting Officer*  *Commissioner of Patents and Trademarks*